United States Patent
Gashette

(10) Patent No.: US 9,253,816 B1
(45) Date of Patent: Feb. 2, 2016

(54) SELF-CONTAINED AREA NETWORK SYSTEM

(75) Inventor: Nathaniel Shane Gashette, Missouri City, TX (US)

(73) Assignee: THE BOEING COMPANY, Chicago, IL (US)

( * ) Notice: Subject to any disclaimer, the term of this patent is extended or adjusted under 35 U.S.C. 154(b) by 550 days.

(21) Appl. No.: 13/413,243

(22) Filed: Mar. 6, 2012

Related U.S. Application Data

(63) Continuation-in-part of application No. 13/173,091, filed on Jun. 30, 2011, now abandoned.

(51) Int. Cl.
*H04W 84/00* (2009.01)
*H04W 84/02* (2009.01)
*H04W 84/06* (2009.01)

(52) U.S. Cl.
CPC ............ *H04W 84/005* (2013.01); *H04W 84/02* (2013.01); *H04W 84/06* (2013.01)

(58) Field of Classification Search
CPC .... H04W 84/005; H04W 84/02; H04W 84/06
USPC ........................................................ 343/800
See application file for complete search history.

(56) References Cited

U.S. PATENT DOCUMENTS

| | | | |
|---|---|---|---|
| 2,512,725 A | 6/1950 | Mock | |
| 4,028,709 A | 6/1977 | Berkowitz et al. | |
| 6,107,972 A | 8/2000 | Seward et al. | |
| 6,348,899 B1 | 2/2002 | Bergstein | |
| 6,836,256 B2 | 12/2004 | Hung | |
| 7,239,291 B2 | 7/2007 | Walton | |
| 7,911,406 B2 | 3/2011 | Eckwielen et al. | |
| 2007/0109213 A1 | 5/2007 | Takahashi | |
| 2007/0262912 A1 | 11/2007 | Eckwielen et al. | |
| 2007/0287473 A1* | 12/2007 | Dupray ...................... | 455/456.1 |
| 2009/0086043 A1* | 4/2009 | Scheucher ................. | 348/211.4 |
| 2009/0102296 A1* | 4/2009 | Greene et al. ................. | 307/149 |
| 2009/0140939 A1 | 6/2009 | Bongfeldt et al. | |
| 2009/0267852 A1 | 10/2009 | Tahmisian et al. | |
| 2010/0263524 A1* | 10/2010 | Morin et al. ................. | 89/27.12 |
| 2010/0315301 A1 | 12/2010 | Marten et al. | |
| 2012/0118133 A1* | 5/2012 | Saucedo ...................... | 89/36.02 |

OTHER PUBLICATIONS

Office Action, dated Mar. 27, 2013, regarding U.S. Appl. No. 13/173,091, 17 pages.
Office Action, dated Feb. 12, 2014, regarding U.S. Appl. No. 13/173,091, 12 pages.
Final Office Action, dated Sep. 9, 2013, regarding U.S. Appl. No. 13/173,091, 14 pages.
"TV/ Fm radio antenna", shenhzhen dongfengsun Tech co., ltd, 1 page, retrieved Jun. 24, 2011, http://www.allproducts.com/manufacture100/jony/product3.html.

(Continued)

*Primary Examiner* — Hoang V Nguyen
*Assistant Examiner* — Michael Bouizza
(74) *Attorney, Agent, or Firm* — Yee & Associates, P.C.

(57) ABSTRACT

A method and apparatus for routing information. A wireless network is established using a portable wireless communications node comprising a portable platform, an energy harvesting system connected to the portable platform, and a wireless communications system connected to the portable platform. The wireless communications system is configured to transfer information using radio frequency signals.

13 Claims, 15 Drawing Sheets

(56) References Cited

OTHER PUBLICATIONS

"V-Frame", Valmont Structures, 1 pages, retrieved on Jan. 17, 2012, http://oldparts.valmont.com/aspx/part.aspx?catid=13&subid=830.
"Marine Solar Stik 100 Transom Mount System", Solar Stik, 5 pages, retrieved on 06/24/201, http://www.solarstik.com/products/access/ss_mounts.php.
"Antenna/Cable Accessories", Newmar, 1 page, retrieved on Jun. 24, 2011, http://www.newmarpower.com/Antenna_Cable_Accessories/Antenna-Cable_Accessories2.html.
"Iridium Antenna Mount", Satphonestore, 1 page, retrieved on Jun. 24, 2011, http://www.satphonestore.com/satellite-phones/satellite-phone-accessories/iridium-antenna-mount.html.
U.S. Appl. No. 13/173,092, filed Jun. 30, 2011, 42 pages.
Final Office Action, dated Sep. 12, 2014, regarding U.S. Appl. No. 13/173,091, 17 pages.

* cited by examiner

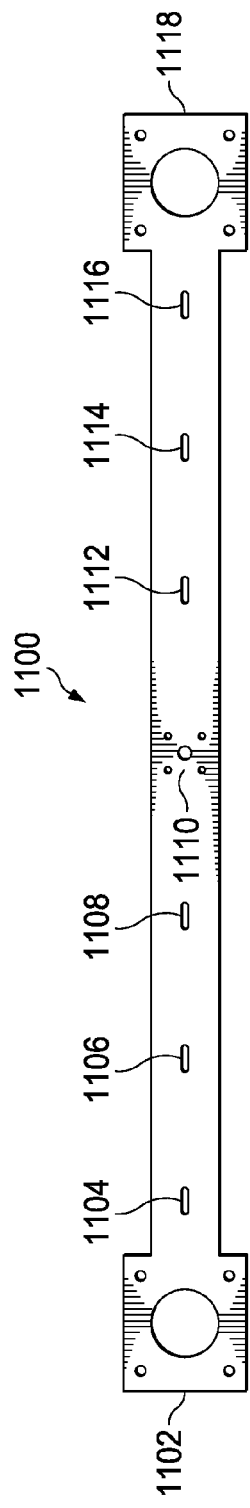
FIG. 11
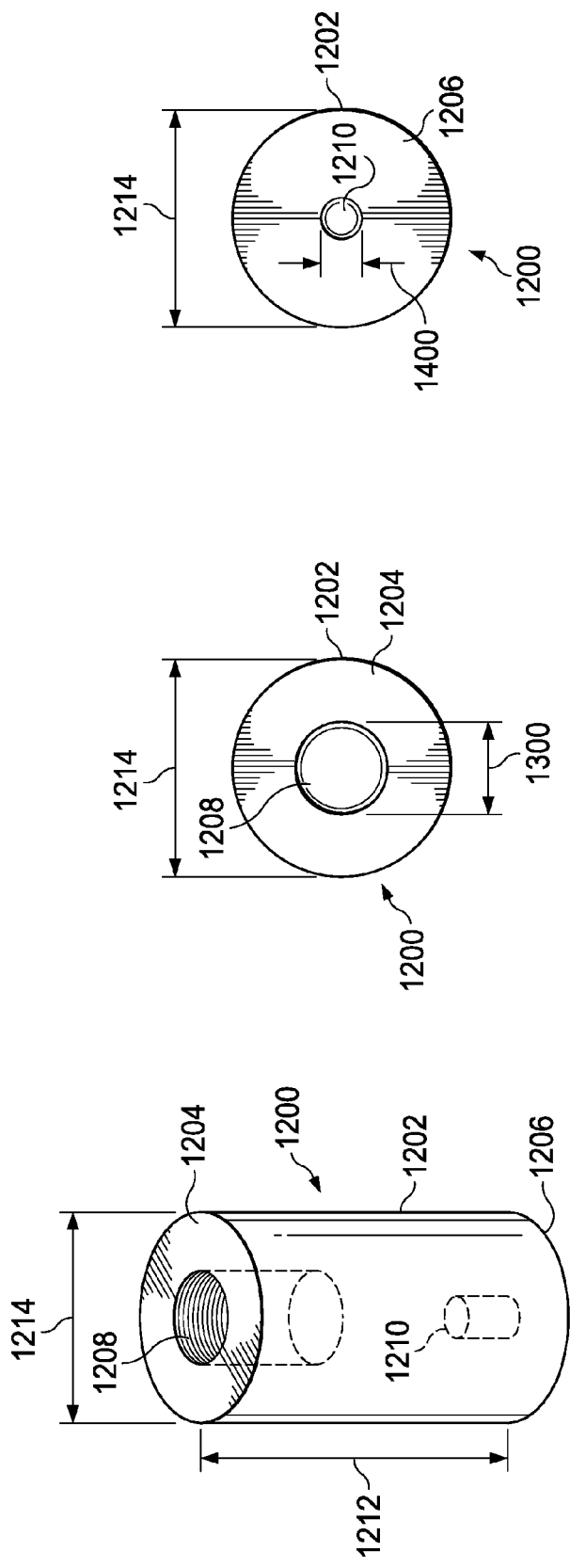
FIG. 12
FIG. 13
FIG. 14

SELF-CONTAINED AREA NETWORK SYSTEM

CROSS-REFERENCE TO RELATED APPLICATION

This application is a continuation-in-part of U.S. patent application Ser. No. 13/173,091, filed Jun. 30, 2011, entitled "Antenna Mounting Structure", which is incorporated herein by reference.

BACKGROUND INFORMATION

1. Field

The present disclosure relates generally to communications and, in particular, to deployable communication nodes for wireless communications.

2. Background

Personnel may be deployed or moved into new geographic areas to perform a mission. The mission may include, for example, without limitation, a military mission, a search and rescue mission, a firefighting mission, an exploration mission, and other suitable types of missions.

Communication between personnel is essential to performing a mission. This communication may include using communications systems which aid personnel in sending information about the area, receiving instructions and commands, and/or exchanging other types of information. The personnel may communicate with each other in the field and/or may communicate with other entities in remote locations. Communication between personnel is often performed using wireless communications links in a wireless communications network. These wireless communications links may be, for example, analog radio frequency transmissions using UHF and/or VHF frequencies, cellular transmissions, and WiFi transmissions.

Oftentimes, a wireless communications network is not present or may have been damaged in the area in which the personnel perform a mission. As a result, communications may be established between personnel, vehicles, and/or other entities through mobile devices that establish a network through wireless links. This type of network may be self-configuring and may not have a particular infrastructure. This type of network may take the form of a mobile ad-hoc network. The mobile devices in the mobile ad-hoc network may be carried by personnel or may be located in vehicles.

Further, communications traffic also may be routed by nodes that receive and transmit information. These nodes may be mobile or in fixed locations. These types of nodes may be used to provide greater connectivity for different mobile devices.

For example, mobile devices may use these nodes to form a communications network that may have various types of topologies. For example, the nodes may be part of a mesh topology. These nodes, as well as other nodes, may form a wireless mesh network. A wireless mesh network may be a particular type of wireless ad-hoc network. The wireless mesh network may have a planned configuration for a particular geographic location where the network is to be used.

Currently, the nodes may be located in vehicles or equipment set up in various locations. However, the equipment for currently used nodes is not easily transportable by tactical teams or may not be easily set up in various environments in which the nodes may be needed.

Therefore, it would be desirable to have a method and apparatus that takes into account at least some of the issues discussed above as well as possibly other issues.

SUMMARY

In one illustrative embodiment, a portable wireless communications node comprises a portable platform, a battery system connected to the portable platform, an energy harvester connected to the portable platform, a group of antennas, an antenna platform, and a transceiver connected to the portable platform and the group of antennas. The energy harvester is configured to charge the battery system. The antenna platform comprises a mounting structure, a mounting post connecting the mounting structure to the portable platform, a number of interfaces in the mounting structure, and a number of mounting units connected to the mounting structure at the number of interfaces and connected to a number of antenna elements for the group of antennas. A mounting unit in the number of mounting units is configured to receive an antenna element in the number of antenna elements. The transceiver receives power from the battery system. The transceiver is configured to send and receive radio frequency signals through the group of antennas.

In another illustrative embodiment, a portable wireless communications node comprises a portable platform, an energy harvesting system connected to the portable platform, and a wireless communications system connected to the portable platform. The wireless communications system is configured to transfer information using radio frequency signals.

In yet another illustrative embodiment, a method for routing information is present. A wireless network is established using a portable wireless communications node comprising a portable platform, an energy harvesting system connected to the portable platform, and a wireless communications system connected to the portable platform. The wireless communications system is configured to transfer the information using radio frequency signals. The information is received from a number of communications nodes in the network. The information received is sent to a number of destinations.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 11 is an illustration of a mounting structure for an antenna platform in accordance with an illustrative embodiment;

FIG. 12 is an illustration of a mounting unit in accordance with an illustrative embodiment;

FIG. 13 is an illustration of an end of a mounting unit in accordance with an illustrative embodiment;

FIG. 14 is an illustration of an end of a mounting unit in accordance with an illustrative embodiment;

DETAILED DESCRIPTION

The illustrative embodiments recognize and take into account one or more considerations. For example, the illustrative embodiments recognize and take into account that currently used wireless communications nodes are not as portable as desired. The equipment for the wireless communications nodes requires assembly. For example, transceivers and antennas may be mounted on telephone poles, buildings, or other existing infrastructures. The assembly of these communications nodes may take more time and effort than desired during a mission.

Further, the different illustrative embodiments recognize and take into account that this communications equipment also requires power. For example, the communications equipment may be connected to local utilities. In cases where local utilities are not available, the equipment may be connected to fuel-powered generators.

The fuel-powered generators and the communications equipment are not easily movable by personnel. For example, communications equipment often requires the use of trucks or other vehicles to carry the communications equipment to a location for use. The illustrative embodiments recognize and take into account that some locations may not be easily accessible by ground vehicles.

Thus, one or more illustrative embodiments provide a portable wireless communications node. The portable wireless communications node comprises a portable platform, an energy harvesting system connected to the portable platform, and a wireless communications system connected to the portable platform. In these illustrative examples, "portable", when used with reference to items, means that the item may have a size, weight, or a combination thereof that is movable by one or two human operators.

Figure 1:
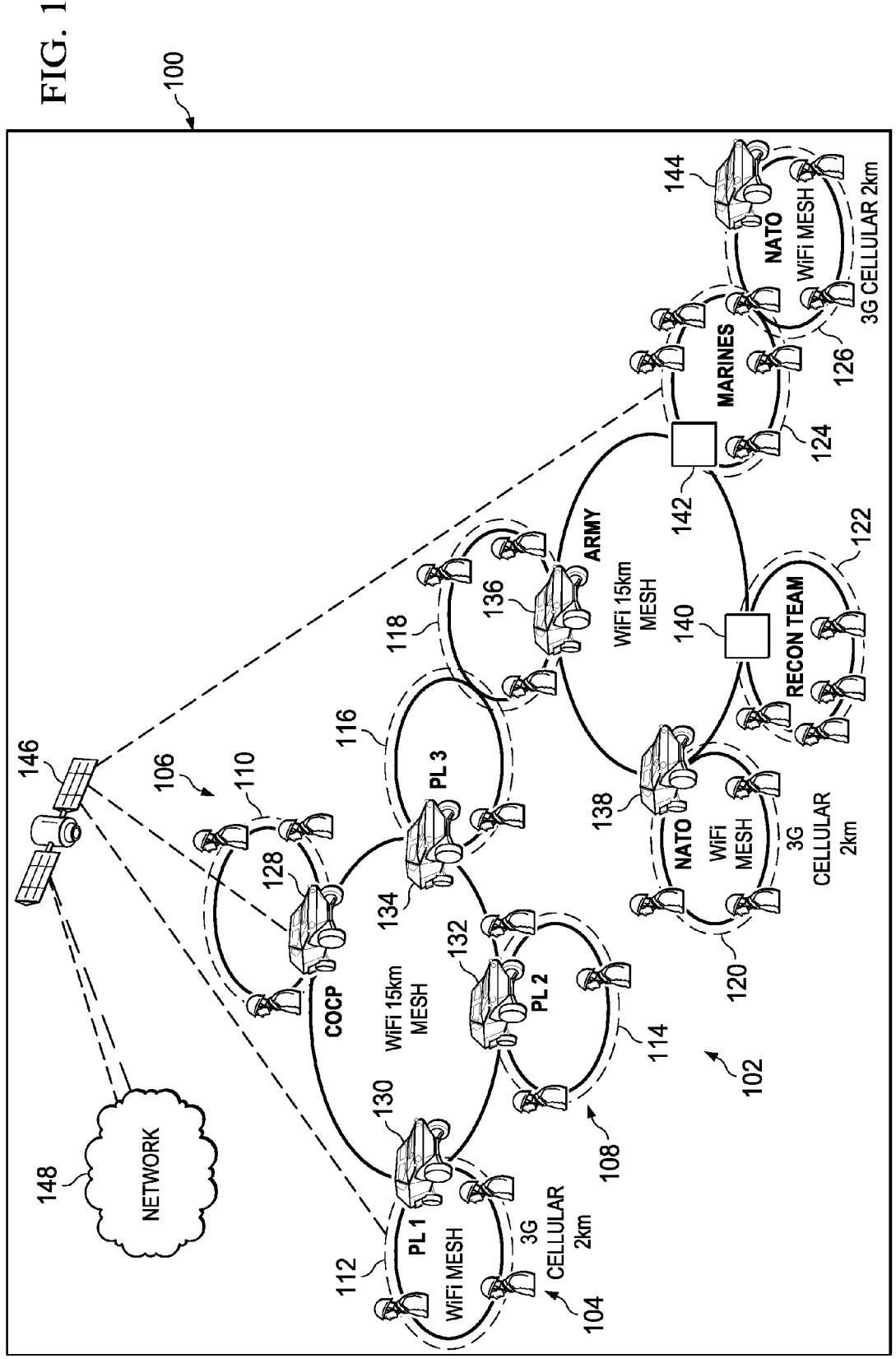
FIG. 1 is an illustration of a communications environment in accordance with an illustrative embodiment.

With reference now to the figures and, in particular, with reference first to FIG. 1, an illustration of a communications environment is depicted in accordance with an illustrative embodiment. As depicted, communications environment 100 may be used to provide communications between operators 104 in location 102.

In this illustrative example, operators 104 perform a mission in location 102. This mission may be, for example, without limitation, surveillance, search and rescue, surveying, firefighting, exploration, enemy target suppression, and other suitable types of missions.

Location 102 may be a location in which a communications infrastructure is nonexistent or damaged. In these illustrative examples, wireless network 106 is established in location 102. Wireless network 106 may be, for example, an ad-hoc network. More specifically, wireless network 106 may be a mesh network, depending on the particular implementation.

As depicted, wireless network 106 may be comprised of subnetworks 108. These subnetworks may take the form of local area networks. As depicted, wireless network 106 includes subnetworks 110, 112, 114, 116, 118, 120, 122, 124, and 126.

Each subnetwork in subnetworks 108 includes wireless communications nodes. In particular, the wireless communications nodes may include client nodes and routers. A client node may be, for example, without limitation, a mobile phone, a radio, a computer system, and other suitable types of devices that may be used by an operator. A router in a subnetwork is configured to route information between client nodes within the subnetwork. Further, the router also may route communications to another router in another subnetwork.

In these illustrative examples, routers in subnetworks 108 include router 128 in subnetwork 110, router 130 in subnetwork 112, router 132 in subnetwork 114, router 134 in subnetwork 116, router 136 in subnetwork 118, router 138 in subnetwork 120, router 140 in subnetwork 122, router 142 in subnetwork 124, and router 144 in subnetwork 126.

As depicted, routers 128, 130, 132, 134, 136, 138, and 144 are mobile communications nodes that take the form of vehicles. Router 140 and router 142 are portable communications nodes in accordance with an illustrative embodiment. Router 140 and router 142 are in fixed locations but may be movable.

In particular, router 140 and router 142 are examples of portable wireless communications nodes in accordance with an illustrative embodiment. The locations of router 140 and router 142 may be those not easily accessible by vehicles. In these illustrative examples, router 140 and router 142 may be carried by human operators, air dropped, or otherwise placed into desired locations.

These nodes may be self-contained area network systems. In other words, each of these nodes may be configured to provide services to establish a network, such as subnetwork 122 and subnetwork 124.

These nodes also may provide communication with other subnetworks and networks. For example, router 142 also may be configured to act as a gateway to communicate with satellite 146. In these illustrative examples, satellite 146 provides a connection to network 148. Network 148 may be the Internet, an intranet, a local area network, a wide area network, or some other suitable network in a remote location to location 102.

The illustration of communications environment 100 in FIG. 1 is not meant to imply physical or architectural limitations to the manner in which an illustrative embodiment may be implemented. For example, communications environment 100 may include ships, aircraft, and other vehicles that may function as communications nodes. Additionally, other numbers of subnetworks may be present in addition to or in place of subnetworks 108 as illustrated.

Figure 2:
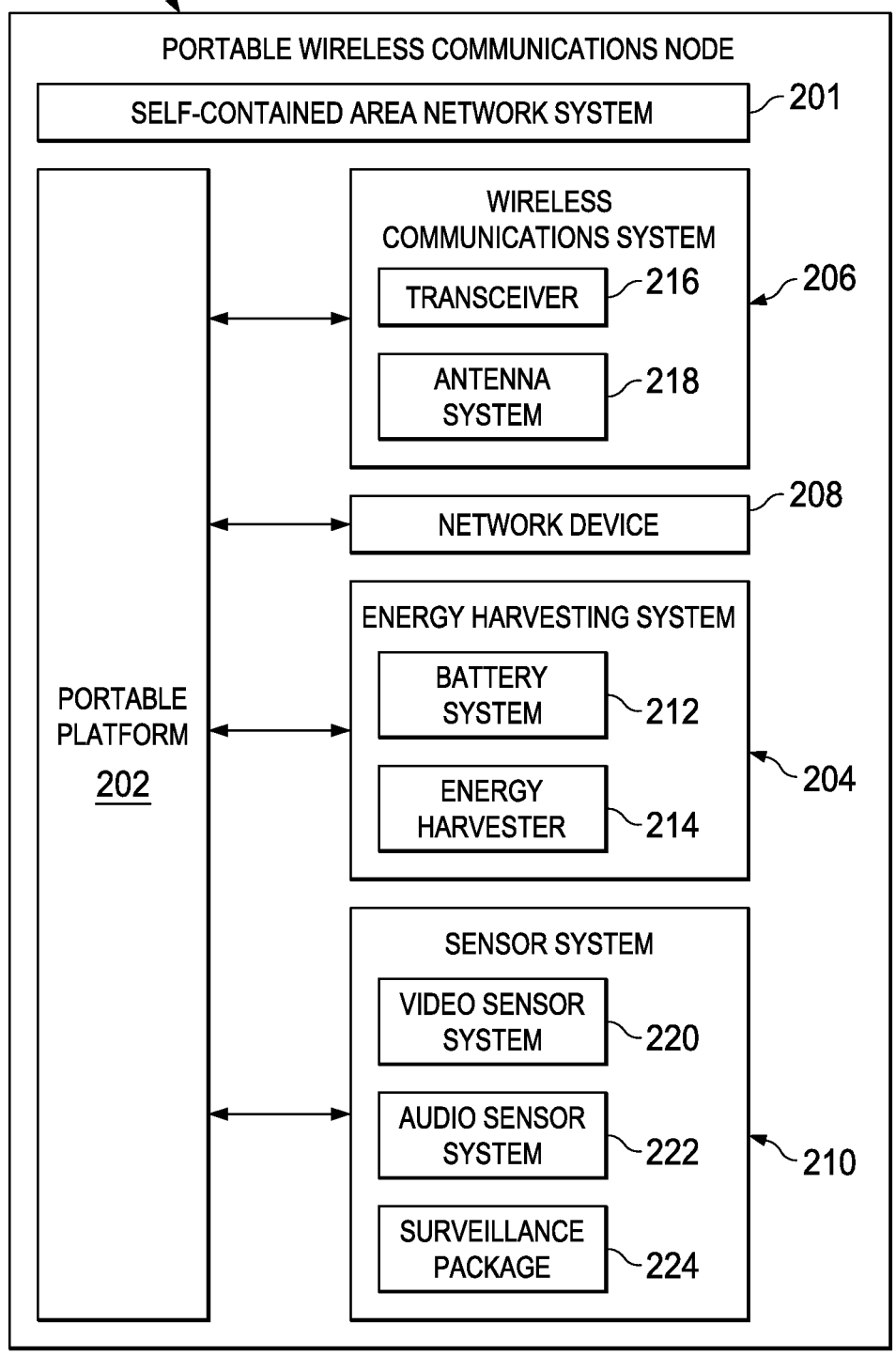
FIG. 2 is an illustration of a block diagram of a portable wireless communications node in accordance with an illustrative embodiment.

Turning now to FIG. 2, an illustration of a block diagram of a portable wireless communications node is depicted in accordance with an illustrative embodiment. Portable wireless communications node 200 is an example of a communications node that may be used to implement router 140 and router 142 in communications environment 100 in FIG. 1.

Portable wireless communications node 200 may take the form of self-contained area network system 201 in these illustrative examples. In these illustrative examples, portable wireless communications node 200 is configured to establish a network for other wireless communications nodes. For example, portable wireless communications node 200 may be used to establish a network, such as subnetwork 122 or subnetwork 124 in FIG. 1.

In these illustrative examples, portable wireless communications node 200 performs a number of functions. As used herein, a "number of", when used with reference to items, means one or more items. For example, a number of functions is one or more functions. For example, portable wireless communications node 200 may function as a router, a cellular station, a gateway, or provide some other suitable type of function.

As depicted, portable wireless communications node 200 comprises portable platform 202, energy harvesting system 204, wireless communications system 206, network device 208, and sensor system 210. Of course, portable wireless communications node 200 may include other components not illustrated, depending on the particular implementation.

In these illustrative examples, portable platform 202 may be any structure or combination of structures configured to carry other components in portable wireless communications node 200. In these illustrative examples, portable platform 202 is configured to be movable by human operators. For example, portable platform 202 may be a stand, a pole, a housing, or some other suitable type of platform that can be carried by human operators.

In one illustrative example, portable platform 202 may be carried by a single human operator. For example, portable platform 202 and other components in portable wireless communications node 200 may be placed into a canvas bag and carried by a single human operator.

Additionally, portable platform 202 may be configured to be dropped into a desired location. For example, portable platform 202 may be air dropped from an aircraft using a parachute connected to portable platform 202. In this manner, portable wireless communications node 200 may be placed into locations that may not be easily accessible by vehicles or human operators.

In this illustrative example, energy harvesting system 204 is connected to portable platform 202. As used herein, a first component, such as energy harvesting system 204, "connected to" a second component, such as portable platform 202, means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Energy harvesting system 204 is configured to generate electrical energy for use by wireless communications system 206, sensor system 210, or both. Energy harvesting system 204 generates electrical energy from the environment around portable wireless communications node 200.

As depicted, energy harvesting system 204 comprises battery system 212 and energy harvester 214. Battery system 212 is one or more batteries and is configured to store electrical energy generated by energy harvester 214. In turn, battery system 212 is electrically connected to wireless communications system 206, network device 208, and sensor system 210. Battery system 212 provides electrical energy to these systems.

Battery system 212 may be, for example, without limitation, at least one of a lithium ion battery, a lead acid battery, a nickel cadmium battery, a lithium air battery, and other suitable types of batteries. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In the illustrative examples, battery system 212 is configured to supply electrical energy in the form of a direct current. The direct current may be, for example, about 12 V to about 24 V and may be about 130 mA.

As depicted, energy harvester 214 is connected to portable platform 202. Energy harvester 214 may be one or more energy harvesting devices. Energy harvester 214 generates electrical energy from the environment around energy harvester 214. Energy harvester 214 may be, for example, without limitation, at least one of a solar cell, a thermoelectric generator, a wind turbine, a tree metabolic energy harvester, and other suitable types of energy harvesting devices.

The different types of energy harvesting devices use different parts of the immediate environment to harvest energy. For example, a solar cell generates electrical energy from sunlight, while a thermoelectric generator generates electrical energy from thermal gradients that may be in the environment. Further, a wind turbine generates electrical energy from the wind, while a tree metabolic energy harvester uses bioenergy harvesting to generate electrical energy from a tree.

Wireless communications system 206 is connected to portable platform 202 and comprises transceiver 216 and antenna system 218. Transceiver 216 is configured to send and receive radio frequency signals using antenna system 218. Radio frequency signals received by transceiver 216 through antenna system 218 contain information. This information may take various forms. For example, without limitation, the information may be analog data, digital data, voice data, and other suitable forms of information.

In these illustrative examples, wireless communications system 206 may be configured to provide at least one of WiFi access, cellular communications, tactical radio frequency communications, satellite communications, and other types of communications. For example, wireless communications system 206 may be configured to receive cellular voice communications from a mobile phone. Additionally, wireless communications system 206 also may be configured to receive data sent over a data link with the mobile phone, a laptop computer, or some other suitable computing device. Tactical radio frequency communications may be voice communications using existing military, government, and other organizational standards.

Network device 208 is configured to establish a network for use by other communications nodes. For example, network device 208 may function as a router, a gateway, or some other suitable device for handling communications with other communications nodes. For example, network device 208 may receive information from a first communications node over a first communications link through wireless communications system 206 and route that information to another communications node on a second communications link. In a similar fashion, network device 208 also may provide voice communications between different communications nodes.

In these illustrative examples, sensor system 210 is connected to portable platform 202. Sensor system 210 may include at least one of video sensor system 220, audio sensor system 222, and other suitable types of sensor systems.

In this illustrative example, video sensor system 220 may generate visual information about the environment around portable wireless communications node 200. As depicted, video sensor system 220 may take the form of a number of different cameras. The number of cameras may be, for example, without limitation, an infrared camera, a visible light camera, and other suitable type of cameras. The number of cameras in video sensor system 220 generates information in the form of video data. The video data generated by the number of cameras may be images, videos, and other types of video data.

Audio sensor system 222 may be a number of microphones that generate audio data. The number of microphones may detect sounds around portable wireless communications node 200.

One or more of these types of systems within sensor system 210 may form surveillance package 224. In this configuration, surveillance package 224 may generate information about targets of interest in the environment around portable wireless communications node 200. These targets of interest may be, for example, without limitation, people, vehicles, and other suitable objects.

The information generated by sensor system 210 may be sent to other communications nodes in the network provided by portable wireless communications node 200. In other examples, portable wireless communications node 200 may send this information to other networks or devices.

In these illustrative examples, portable wireless communications node 200 also may be made of materials that are hard to detect. For example, the different materials for the components in portable wireless communications node 200 may be selected to provide at least one of a thermal signature, a radar signature, a physical profile, and other characteristics that make portable wireless communications node 200 more difficult to detect by human operators and other devices.

As another example, portable wireless communications node 200 may be camouflaged. For example, portable wireless communications node 200 may be configured to resemble a rock, a tree, or some other object in the environment.

The illustration of portable wireless communications node 200 in FIG. 2 is not meant to imply physical or architectural limitations in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative embodiments, sensor system 210 may be omitted. In another illustrative embodiment, sensor system 210 may include other types of sensors in addition to or in place of video sensor system 220 and audio sensor system 222. For example, sensor system 210 may include a thermometer, a vibration detector, and other suitable types of sensors.

In still other illustrative examples, a weapon also may be connected to portable wireless communications node 200. This weapon may be remote controlled using sensor system 210. This weapon may be, for example, without limitation, an explosive, a projectile, a gas, or some other suitable type of weapon.

Figure 3:
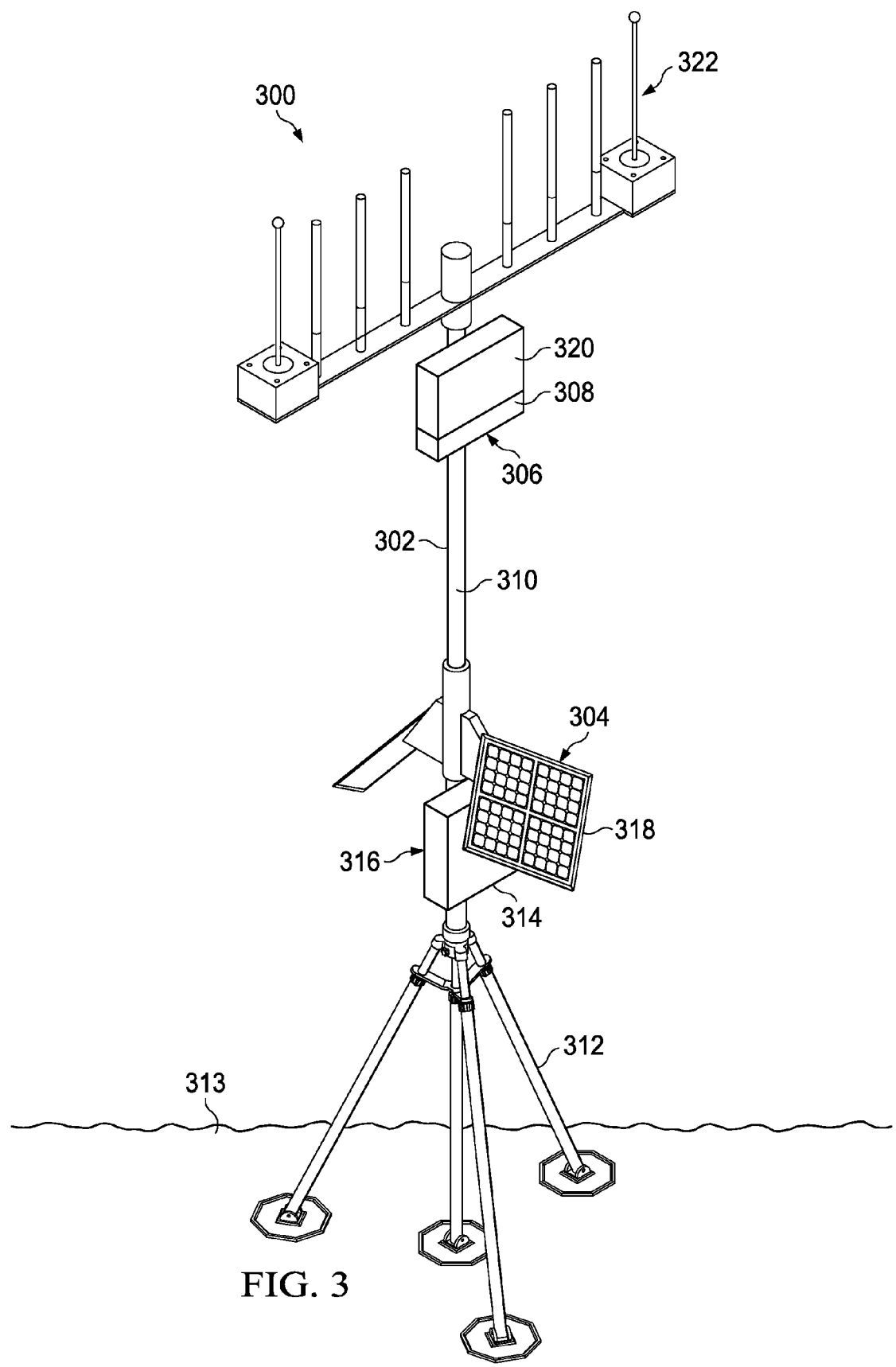
FIG. 3 is an illustration of a portable wireless communications node in accordance with an illustrative embodiment.

Turning now to FIG. 3, an illustration of a portable wireless communications node is depicted in accordance with an illustrative embodiment. In this illustrative example, portable wireless communications node 300 is an example of one physical implementation for portable wireless communications node 200 shown in block form in FIG. 2.

As depicted, portable wireless communications node 300 comprises portable platform 302, energy harvesting system 304, wireless communications system 306, and network device 308.

As depicted, portable platform 302 takes the form of pole 310. Pole 310 may have legs 312 that hold pole 310 in an upright position on ground 313. In this illustrative example, energy harvesting system 304, wireless communications system 306, and network device 308 are connected to pole 310.

Energy harvesting system 304 comprises battery system 314 and energy harvester 316. In this illustrative example, energy harvester 316 takes the form of solar panels 318, which include solar cells. In these illustrative examples, wireless communications system 306 comprises transceiver 320 and antenna system 322.

Figure 4:
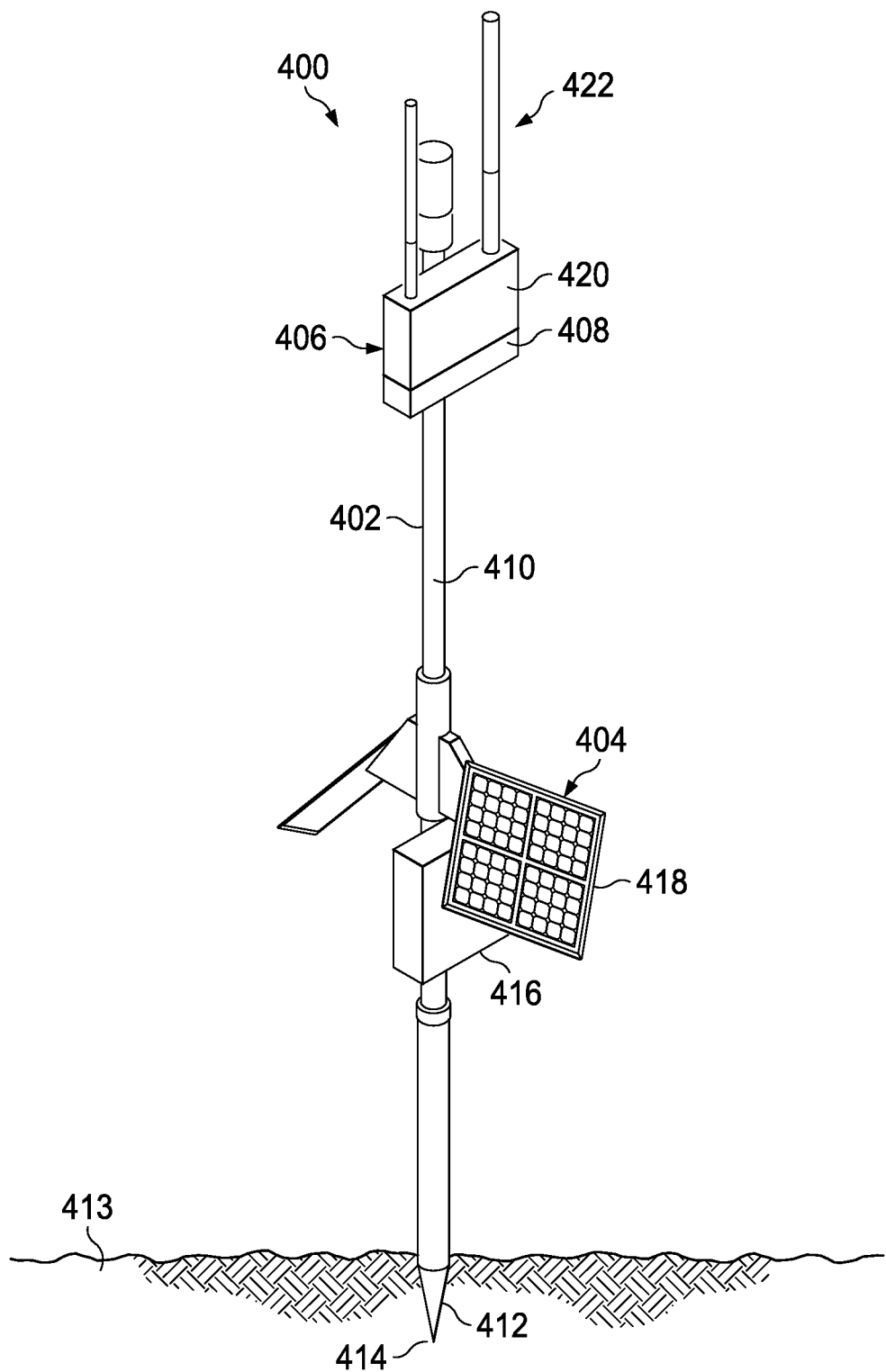
FIG. 4 is an illustration of a portable wireless communications node in accordance with an illustrative embodiment.

Turning now to FIG. 4, an illustration of a portable wireless communications node is depicted in accordance with an illustrative embodiment. In this illustrative example, portable wireless communications node 400 is an example of one physical implementation for portable wireless communications node 200 shown in block form in FIG. 2.

As depicted, portable wireless communications node 400 comprises portable platform 402, energy harvesting system 404, wireless communications system 406, and network device 408.

As depicted, portable platform 402 takes the form of pole 410. In this illustrative example, pole 410 has spike 412 at end 414. Spike 412 may be placed into ground 413 to hold pole 410 in an upright position. In this illustrative example, energy harvesting system 404, wireless communications system 406, and network device 408 are connected to pole 410.

In this illustrative example, energy harvesting system 404 comprises battery system 416 and solar panels 418. Wireless communications system 406 comprises transceiver 420 and antenna system 422.

The illustration of portable wireless communications node 300 in FIG. 3 and portable wireless communications node 400 in FIG. 4 are only meant to provide examples of some possible implementations for portable wireless communications node 200 shown in block form in FIG. 2. In some illustrative examples, a portable wireless communications node may be camouflaged to look like a rock, a tree, or some other structure.

The different components shown in FIGS. 1, 3, and 4 may be combined with components in FIG. 2, used with components in FIG. 2, or a combination of the two. Additionally, some of the components in FIGS. 1, 3, and 4 may be illustrative examples of how components shown in block form in FIG. 2 can be implemented as physical structures.

An antenna is an electrical device. This device is configured to couple an electromagnetic wave, such as a radio frequency wave, in free space to an electric current used by a radio receiver or transmitter. In other words, an antenna can detect an electromagnetic wave and generate a signal for use by a receiver. Further, a transmitter may generate a signal that causes an electromagnetic wave to be generated by the antenna. Antennas are used in many different systems, such as wireless networks, satellite communications, radar, mobile phone communications, and other suitable systems.

An antenna typically consists of an arrangement of conducting elements that are connected to a transmitter and/or receiver. These conducting elements are also referred to as antenna elements. Antennas may come in many different forms. For example, antennas may take the form of a dipole antenna, an omnidirectional antenna, a monopole antenna, a random wire antenna, a phased array antenna, a horn antenna, a directional antenna, a parabolic antenna, a patch antenna, and/or other suitable forms.

When one or more ranges of frequencies are present for which an antenna system is to be used, a single type of antenna may not be capable of operating in the desired frequency ranges. In these cases, multiple antennas may be used in which the different antennas collectively operate in the desired frequency ranges.

An antenna is typically mounted on a structure. The structure provides a mechanism to hold an antenna in a desired orientation or position. These structures may be placed on the ground or attached to an object. The object may be a building, an aircraft, a tower, a pole, or some other suitable type of object.

In one example, a structure for an antenna is attached to a mast. The mast may be placed on the ground or attached to an object. When more than one antenna is present, more than one mast may be needed for the antennas. These masts may be placed in different locations. This type of placement may be undesirable.

With different types of antennas, frequencies used, and other parameters for an antenna system, many different types of antennas and structures for mounting antennas are present. Further, when new requirements are identified, new antennas and antenna structures are designed and manufactured.

The structure for antenna elements in an antenna is designed for a particular configuration of antenna elements. When the configuration of the antenna elements changes, a new structure is designed and manufactured for the new configuration. Considering the number of different configurations that are possible for antenna systems, the number of different parts needed may increase the time and cost needed to manufacture antenna systems.

The different illustrative embodiments take into account one or more considerations. For example, the different illustrative embodiments recognize and take into account that having an antenna system with antennas for different frequencies may be desirable. For example, the different illustrative embodiments recognize and take into account that it may be desirable to have antennas, such as those for WiFi communications, cellular communications, ultra high frequency (UHF), very high frequency (VHF), satellite communications (SATCOM), a global positioning system (GPS), and/or other suitable types of communications.

The different illustrative embodiments recognize and take into account that currently, when different configurations for antennas are present, each type of antenna is placed on a structure, such as an antenna stand. Each antenna stand may hold a different type of antenna. As a result, multiple masts may be used for an antenna system. Having multiple masts may be undesirable with respect to assembling, transporting, and setting up the antenna system. When the antennas are placed on an object, such as a vehicle, having multiple masts on the vehicle also may be undesirable. Multiple masts may take up more space than desired on a vehicle. Also, additional masts may affect the performance of the vehicle in an undesirable manner. Further, additional masts may cost more than desired.

The different illustrative embodiments also recognize and take into account that currently used structures for mounting antennas often do not take into account spacing between antennas needed to reduce interference between the antennas. The different illustrative embodiments recognize and take into account that when antenna spacing is not considered, signal corruption may occur from the interference between the antennas. For example, although the same type of antenna may be used, different lengths of the antenna may be present for different frequencies. If those lengths are changed, the spacing may need to be different between the antennas. Further, if different antennas are placed on the same stand, the spacing needs for each type of antenna also may need to be taken into account to reduce interference.

Thus, the different illustrative embodiments recognize and take into account that based on space, cost, weight, and other considerations, having a single structure for mounting antennas for an antenna system is desirable. The illustrative embodiments provide a method and apparatus for an antenna platform. In one illustrative embodiment, an apparatus comprises a mounting structure, interfaces in the mounting structure, and mounting units. Mounting units are configured to be connected to the mounting structure at the mounting interfaces and connected to antenna elements for an antenna. A mounting unit in the number of mounting units is configured to receive an antenna element within the antenna elements.

Figure 5:
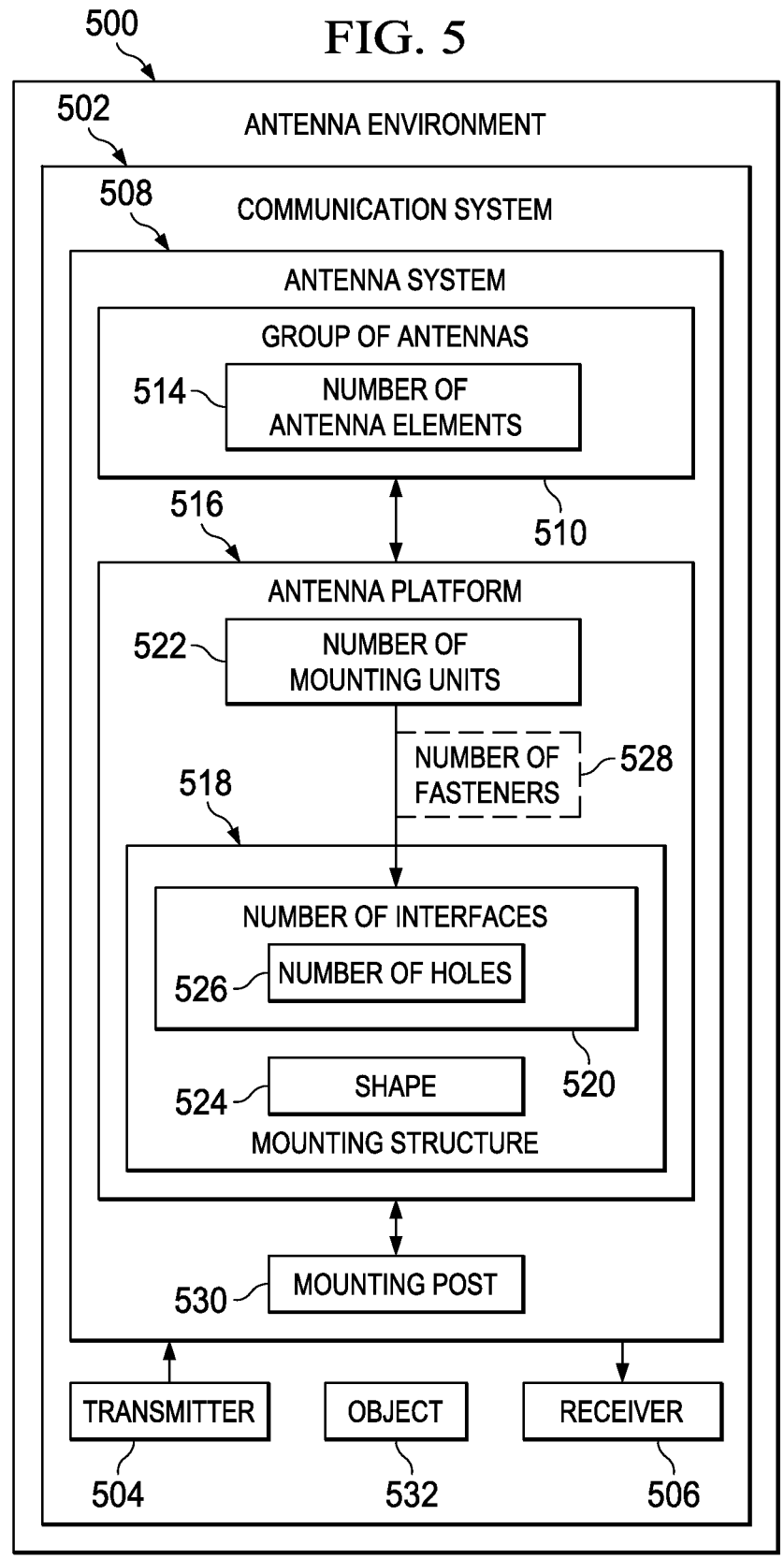
FIG. 5 is an illustration of a block diagram of an antenna environment in accordance with an illustrative embodiment.

Turning now to FIG. 5, an illustration of a block diagram of an antenna environment is depicted in accordance with an illustrative embodiment. In this illustrative example, antenna environment 500 includes communication system 502. Communication system 502 may be used to receive information, transmit information, or a combination of the two. In this illustrative example, communication system 502 comprises transmitter 504, receiver 506, and antenna system 508. Antenna system 508 is an example of an antenna system that may be used to implement antenna system 218 in portable wireless communications node 200 in FIG. 2.

Transmitter 504 may generate signals that cause antenna system 508 to generate electromagnetic waves. These electromagnetic waves are radio frequency signals in these illustrative examples. Electromagnetic waves coupled by antenna system 508 may be turned into signals by receiver 506.

In these illustrative examples, antenna system 508 comprises group of antennas 510. As used herein, "a group", when used with reference to an item, means one or more items. Group of antennas 510 means one or more antennas.

Group of antennas 510 is connected to antenna platform 516. In particular, number of antenna elements 514 is connected to antenna platform 516.

Antenna platform 516 comprises mounting structure 518, number of interfaces 520, and number of mounting units 522. As used herein, a first component "connected to" a second component means that the first component, such as one of number of antenna elements 514, can be connected directly or indirectly to the second component, such as antenna platform 516. In other words, additional components may be present between the first component and the second component. The first component is considered to be indirectly connected to the second component when one or more additional components are present between the two components. When the first component is directly connected to the second component, no additional components are present between the two components.

In these illustrative examples, mounting structure 518 has shape 524. Shape 524 is substantially planar in the depicted examples. Mounting structure 518 may be comprised of a material suitable for supporting group of antennas 510. Further, the material used in mounting structure 518 also may be selected to be suitable for withstanding exposure to the particular environment in which antenna system 508 is located. For example, the material for mounting structure 518 may be selected from at least one of a conductive material, a metal, a metal alloy, aluminum, steel, titanium, and/or other suitable materials.

In these illustrative examples, number of interfaces 520 is comprised of number of holes 526. Number of holes 526 may be all the same size or may have different sizes. Further, number of holes 526 may have different shapes. For example, a hole in number of holes 526 may have a shape selected from a circle, an oval, a rectangle, a slot, and other suitable shapes. Different holes within number of holes 526 may have different shapes, depending on the particular implementation. Each interface in number of interfaces 520 may have one or more holes from number of holes 526.

Number of mounting units 522 is configured to be connected to mounting structure 518 at number of interfaces 520. Number of mounting units 522 may be comprised of a material selected from at least one of a conductive material, a metal, a metal alloy, aluminum, steel, titanium, and/or other suitable materials.

In particular, number of mounting units 522 is configured to be connected to mounting structure 518 at number of holes 526 using number of fasteners 528. Number of fasteners 528 may be, for example, a screw, a rivet, a bolt and nut, and/or other suitable types of fasteners.

Number of mounting units 522 is configured to receive number of antenna elements 514 for group of antennas 510. Additionally, number of interfaces 520 also may be configured to receive mounting post 530. Mounting post 530 may be connected to object 532. Object 532 may take a number of different forms. For example, object 532 may be selected from one of a stand, a tower, a building, a truck, a ship, an aircraft, a personnel carrier, and other suitable types of objects.

The illustration of antenna environment 500 in FIG. 5 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, communication system 502 may not include both transmitter 504 and receiver 506. In some cases, only transmitter 504 may be present. In other cases, only receiver 506 may be present. In still other illustrative examples, transmitter 504 and receiver 506 may be implemented as a single component in the form of a transceiver.

In still other illustrative examples, additional platforms in addition to antenna platform 516 may be present in communication system 502. Additionally, antenna system 508 may include one or more antenna platforms in addition to antenna platform 516 to which a portion of number of antenna elements 514 is connected to group of antennas 510.

Figure 6:
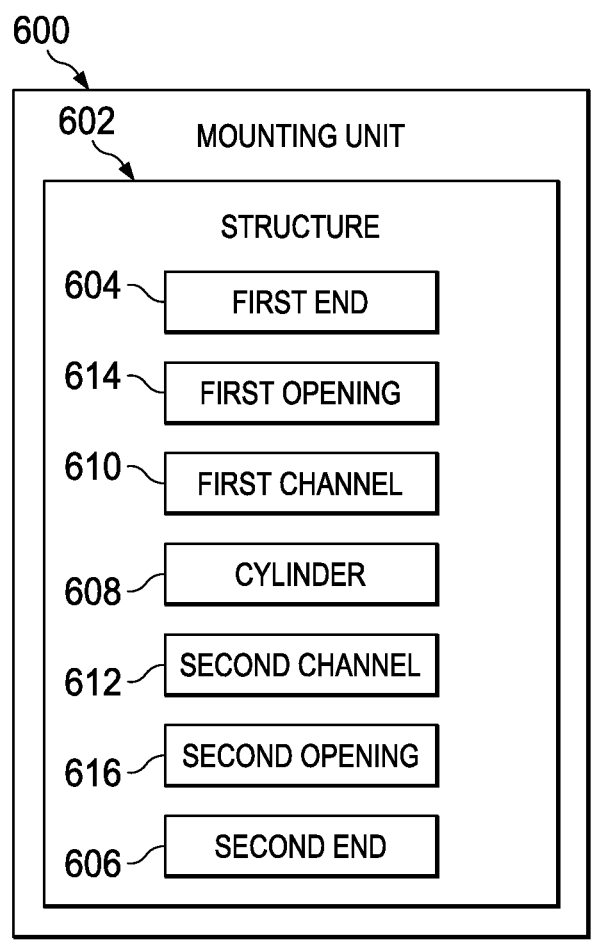
FIG. 6 is an illustration of a block diagram of a mounting unit in accordance with an illustrative embodiment.

With reference now to FIG. 6, an illustration of a block diagram of a mounting unit is depicted in accordance with an illustrative embodiment. In this illustrative example, mounting unit 600 is an example of a mounting unit within number of mounting units 522 in FIG. 5.

As depicted, mounting unit 600 comprises structure 602 having first end 604 and second end 606. Structure 602, in this illustrative example, takes the form of cylinder 608. Structure 602 may be comprised of a material similar to the material selected for mounting structure 518 in FIG. 5.

In this illustrative example, first channel 610 is open at first end 604, and second channel 612 is open at second end 606. Second channel 612 is configured to receive an antenna element in number of antenna elements 514 in FIG. 5. First channel 610 is configured to receive a fastener in number of fasteners 528 to connect mounting unit 600 to an interface in number of interfaces 520 in FIG. 5.

First channel 610 has a shape configured to receive a portion of an antenna element. First channel 610 may be configured to provide an interference fit for the antenna element through first opening 614 to first channel 610 on first end 604. As another illustrative example, first channel 610 may include threads, grooves, or other features that may be used to connect an antenna element to mounting unit 600. As another example, an adhesive or other material may be used to bond the portion of the antenna element in first channel 610 to mounting unit 600.

In these illustrative examples, second channel 612 may receive a fastener in the form of a screw through second opening 616 to second channel 612 at second end 606. Grooves may be present in second channel 612 to receive the screw.

The illustration of mounting unit 600 is not meant to imply physical or architectural limitations to the manner in which an illustrative embodiment may be implemented. Other components in addition to or in place of those depicted may be used. For example, one or more additional channels may be present in addition to second channel 612 at second end 606. The additional channels may be present for use with additional fasteners.

Figure 7:
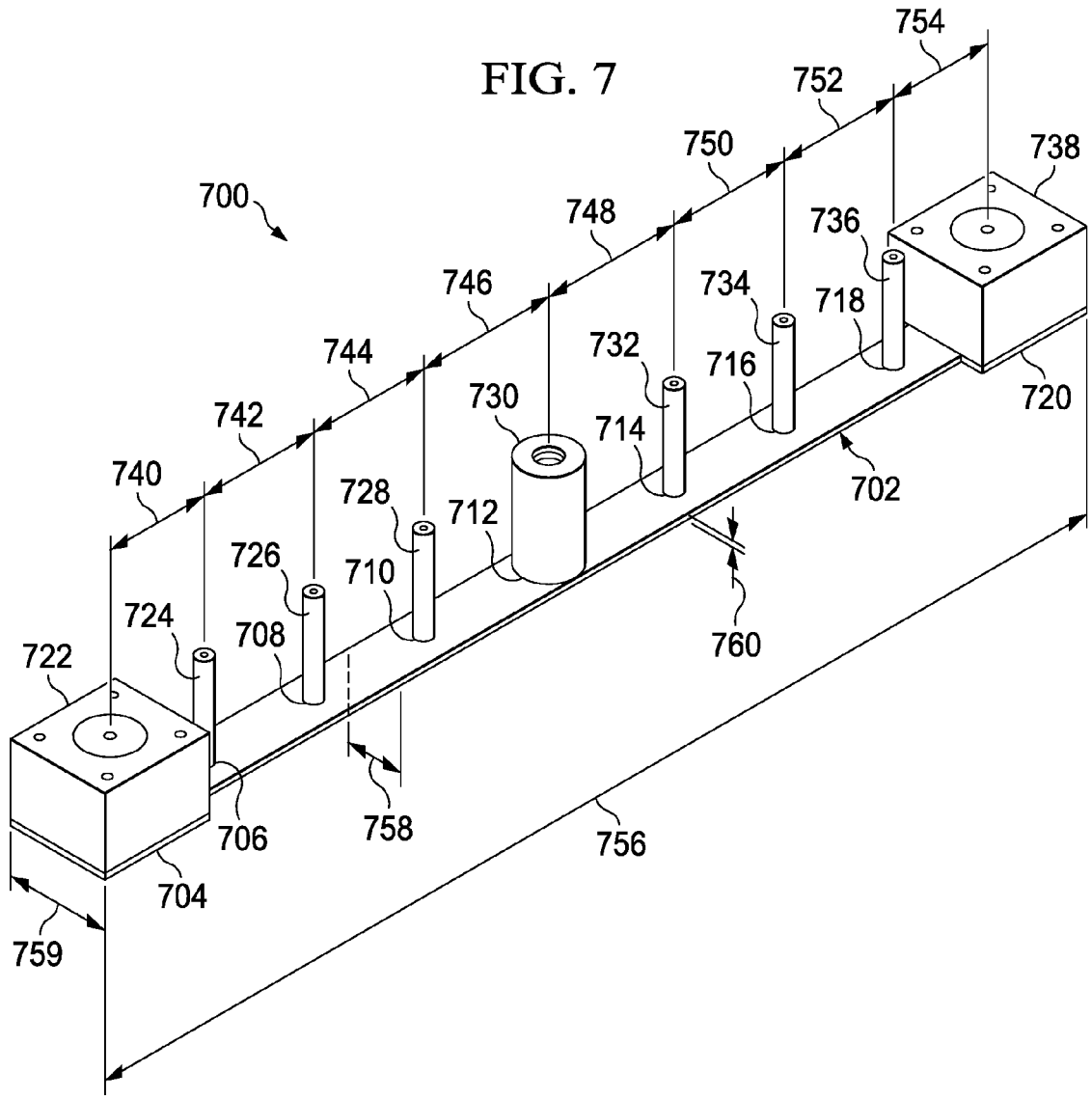
FIG. 7 is an illustration of an antenna platform in accordance with an illustrative embodiment.

With reference now to FIG. 7, an illustration of an antenna platform is depicted in accordance with an illustrative embodiment. In this illustrative example, antenna platform 700 is shown in a perspective view and is an example of a physical implementation of antenna platform 516 shown in block form in FIG. 5.

As depicted, antenna platform 700 comprises mounting structure 702. Mounting structure 702 has interfaces 704, 706, 708, 710, 712, 714, 716, 718, and 720. In this illustrative example, mounting units 722, 724, 726, 728, 730, 732, 734, 736, and 738 are also part of antenna platform 700. These mounting units are connected to interfaces 704, 706, 708, 710, 712, 714, 716, 718, and 720, respectively. These connections may be made using fasteners (not shown).

The dimensions and shapes for these mounting units may vary, depending on the particular implementation. For example, mounting unit 722 and mounting unit 738 have a shape of a cube in this illustrative example. Mounting units 724, 726, 728, 730, 732, 734, and 736 have a shape of a cylinder in this illustrative example. Of course, other shapes may be used based on the particular implementation.

In this illustrative example, mounting unit 730 is larger than mounting units 724, 726, 728, 732, 734 and 736. This larger size may be selected based on the type of antenna or antenna element to be connected to mounting unit 730.

In these illustrative examples, mounting units 724, 726, 728, 732, 734, and 736 may have a diameter from about two inches to about four inches. Mounting unit 730 may have a diameter from about two inches to about six inches. Mounting units 722 and 738 may be about six inches by about six inches.

The height of these mounting units may vary, depending on the particular implementation. The height is selected in a manner that allows a mounting unit to be connected to an antenna element such that the antenna element may be connected in a desired manner to mounting structure 702. For example, the height of the different mounting units may be about three inches to about eight inches. Of course, other heights may be used, depending on the particular implementation.

Another factor for selecting different dimensions for the mounting units is weight. The dimensions may be selected to reduce weight, while providing a desired connection for antenna elements.

In this illustrative example, mounting unit 722 and mounting unit 738 are for one type of antenna, such as a very high frequency (VHF) antenna. Mounting units 724, 726, 728, 732, 734, and 736 are configured to receive antenna elements for another type of antenna, such as an ultrahigh frequency (UHF) antenna.

Mounting unit 730 is configured to receive an antenna element for yet another type of antenna. For example, mounting unit 730 may be configured to receive a parabolic antenna. As a result, three types of antennas may be connected to mounting structure 702 in this illustrative example.

In these illustrative examples, interfaces may be formed in mounting structure 702 with distances between each other to provide a desired amount of spacing between antenna elements for different antennas. The spacing may be such that interference between antenna elements is reduced.

These interfaces may be created in mounting structure 702 after the selection of a configuration of antennas for antenna platform 700. In other examples, the interfaces may be preformed or have different spacing. As a result, some interfaces may be used while others remain unused, depending on the configuration of the antennas for antenna platform 700.

As depicted, distance 740 is present between mounting unit 722 and mounting unit 724, distance 742 is present between mounting unit 724 and mounting unit 726, distance 744 is present between mounting unit 726 and mounting unit 728, and distance 746 is present between mounting unit 728 and mounting unit 730. Distance 748 is present between mounting unit 730 and mounting unit 732, distance 750 is present between mounting unit 732 and mounting unit 734, distance 752 is present between mounting unit 734 and mounting unit 736, and distance 754 is present between mounting unit 736 and mounting unit 738. These distances may be the same or different, depending on the particular implementation.

The distances provide spacing between antenna elements for different antennas. In these illustrative examples, the distances are selected to reduce interference between antennas when more than one antenna is connected to mounting structure 702 in antenna platform 700.

Additionally, spacing between the antenna elements also may be based on the height of mounting units in addition to or in place of the distance between mounting units. Mounting units of different heights may be used to provide a desired spacing between antenna elements in addition to the distance between mounting units.

With one or more of the different illustrative embodiments, the time and effort needed to configure antenna platform 700 may be reduced through the use of the mounting units. The mounting units may be selected from pre-manufactured components. In this manner, antenna platform 700 may be configured more quickly than by designing and manufacturing a single-piece platform for each desired configuration of an antenna system. As depicted, antenna platform 700 may weigh about 38 pounds and may be configured to hold a weight of about 200 pounds or more when different components are attached to antenna platform 700.

As depicted, mounting structure 702 has length 756, width 758, width 759, and thickness 760. Length 756 is about six feet, width 758 is about four inches, width 759 is about six inches, and thickness 760 is about one-half inch. These dimensions may vary, depending on the particular implementation for mounting structure 702. For example, length 756 may be from about five feet to about nine feet. Width 758 may be from about one inch to about six inches. Width 759 may be from about two inches to about 10 inches. Thickness 760 may be from about one-half inch to about one inch. Of course, other values for these dimensions may be used, depending on the particular implementation.

Other shapes other the one illustrated for mounting structure 702 also may be used in addition to different dimensions. For example, mounting structure 702 may be rectangular, oval, irregular, or some other suitable shape. The particular shape for mounting structure 702 may be selected based on the type of antennas, the configuration of antennas, the environment in which mounting structure 702 is to be used, and other suitable factors.

For example, the length may depend on the number of antenna elements used. The length, width, and thickness also may be selected based on the amount of weight to be supported. These dimensions also may be selected based on the environment in which mounting structure 702 is to be used.

For example, dimensions for mounting structure 702 may vary when mounting structure 702 is placed on a vehicle as opposed to on a mast that is placed on the ground. For example, thickness 760 may be greater for mounting structure 702 when used on a vehicle instead of a mast.

In this illustrative example, mounting structure 702 is comprised of aluminum. Mounting structure 702 is formed from a single piece rather than multiple pieces in these depicted examples. Mounting units 722, 724, 726, 728, 732, 734, 736, and 738 also may be comprised of aluminum.

In this illustrative example, mounting units 724, 726, 728, 732, 734, and 736 are configured to receive antenna elements for an antenna that may be a commercial off-the-shelf antenna. Mounting unit 722 and mounting unit 738 may be configured to receive a NATO-type antenna. In some illustrative examples, mounting unit 722 and mounting unit 738 may be part of an antenna element for this type of antenna.

These mounting units may be manufactured or selected from pre-manufactured mounting units. When a configuration for an antenna changes or elements is changed in a particular antenna, the mounting posts may be changed without having to remanufacture or redesign all of antenna platform 700 in these illustrative examples.

Figure 8:
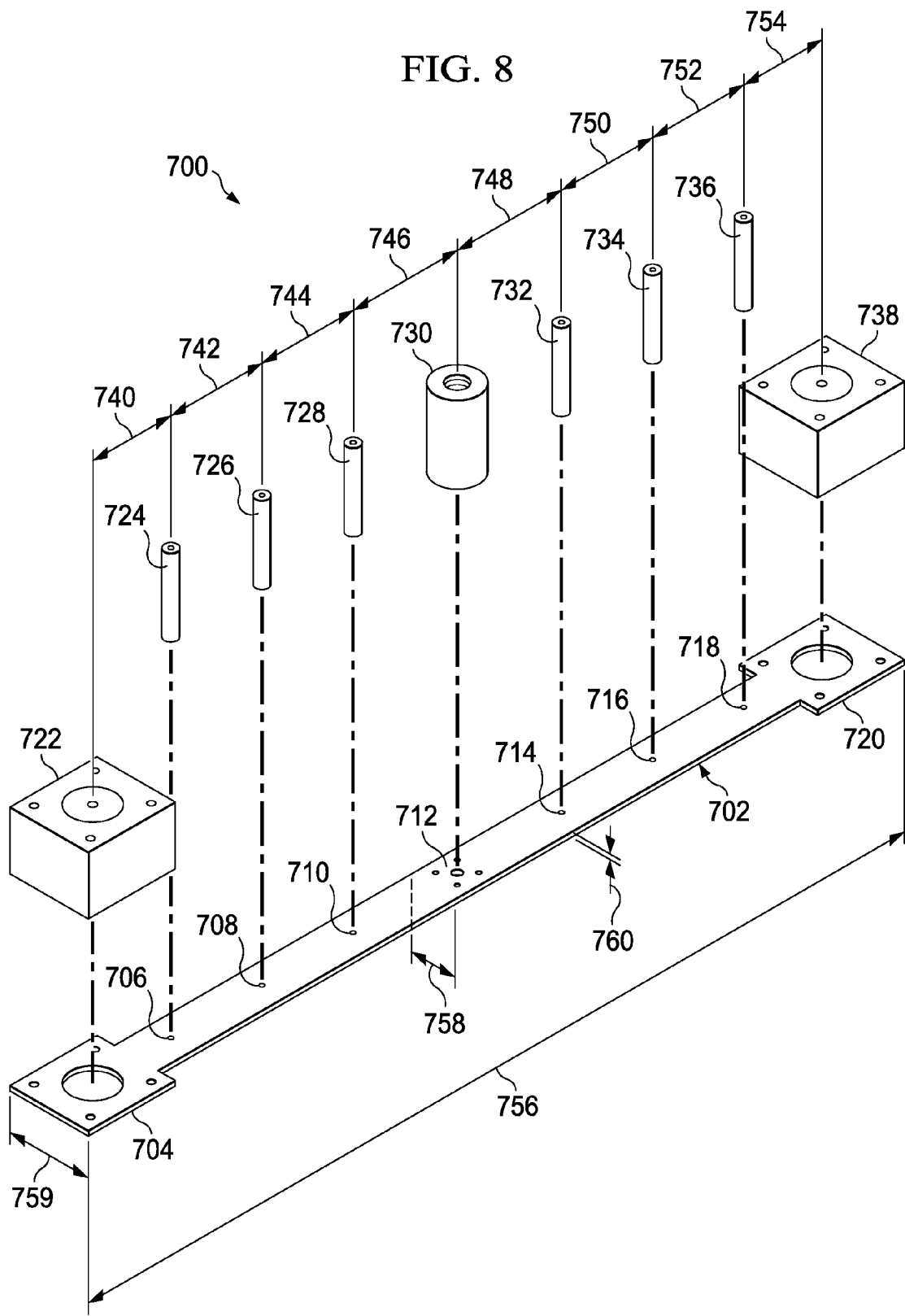
FIG. 8 is an illustration of an exploded view of an antenna platform in accordance with an illustrative embodiment.

With reference now to FIG. 8, an illustration of an exploded view of an antenna platform is depicted in accordance with an illustrative embodiment. In this illustrative example, antenna platform 700 is shown in an exploded view.

Figure 9:
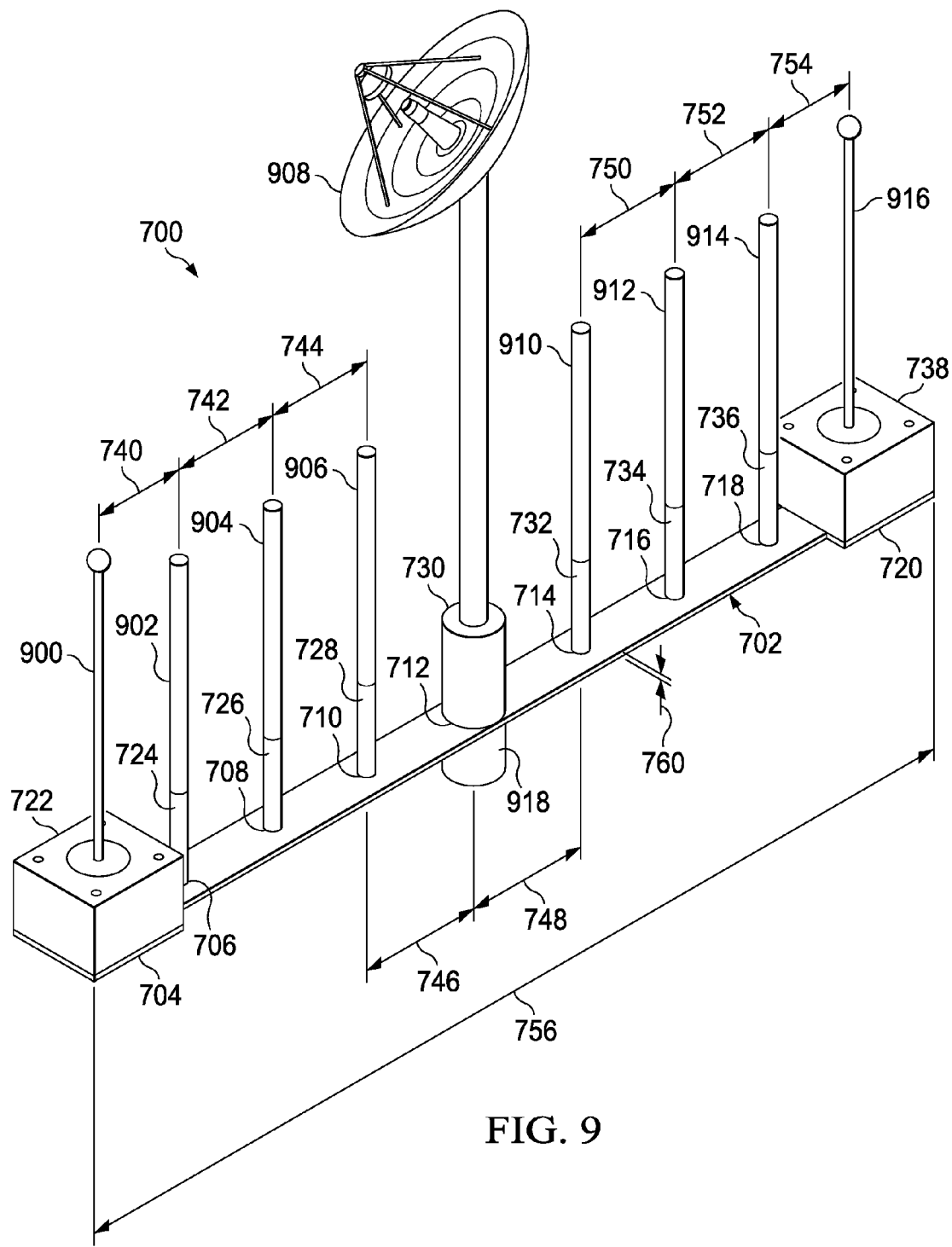
FIG. 9 is an illustration of antenna elements connected to an antenna platform in accordance with an illustrative embodiment.

With reference now to FIG. 9, an illustration of antenna elements connected to an antenna platform is depicted in accordance with an illustrative embodiment. In this illustrative example, antenna elements 900, 902, 904, 906, 908, 910,

912, 914, and 916 are connected to mounting units 722, 724, 726, 728, 730, 732, 734, 736, and 738, respectively.

Antenna element 900 and antenna element 916 are whip antennas in these examples. In particular, these whip antennas may take the form of NATO antennas. Antenna elements 902, 904, 906, 910, 912, and 914 may be commercial off-the-shelf antenna elements used for wireless communications. In particular, these antenna elements may be used for cellular communications in this illustrative example. Antenna element 908 is a parabolic antenna and may be used for directional communications.

In this illustrative example, mounting post 918 has been attached to interface 712 below mounting unit 730. Mounting post 918 may be connected to a mast, a truck, an aircraft, or some other suitable object. The mast may be an extendable mast that may change heights. In turn, the mast may be connected to another object, such as a truck, a ship, or the ground.

Although a particular configuration is shown in FIG. 9 for antenna platform 700, antenna platform 700 may be easily reconfigured through the use of mounting structure 702; interfaces 704, 706, 708, 710, 712, 714, 716, 718, and 720; and mounting units 722, 724, 726, 728, 730, 732, 734, 736, and 738.

Figure 10:
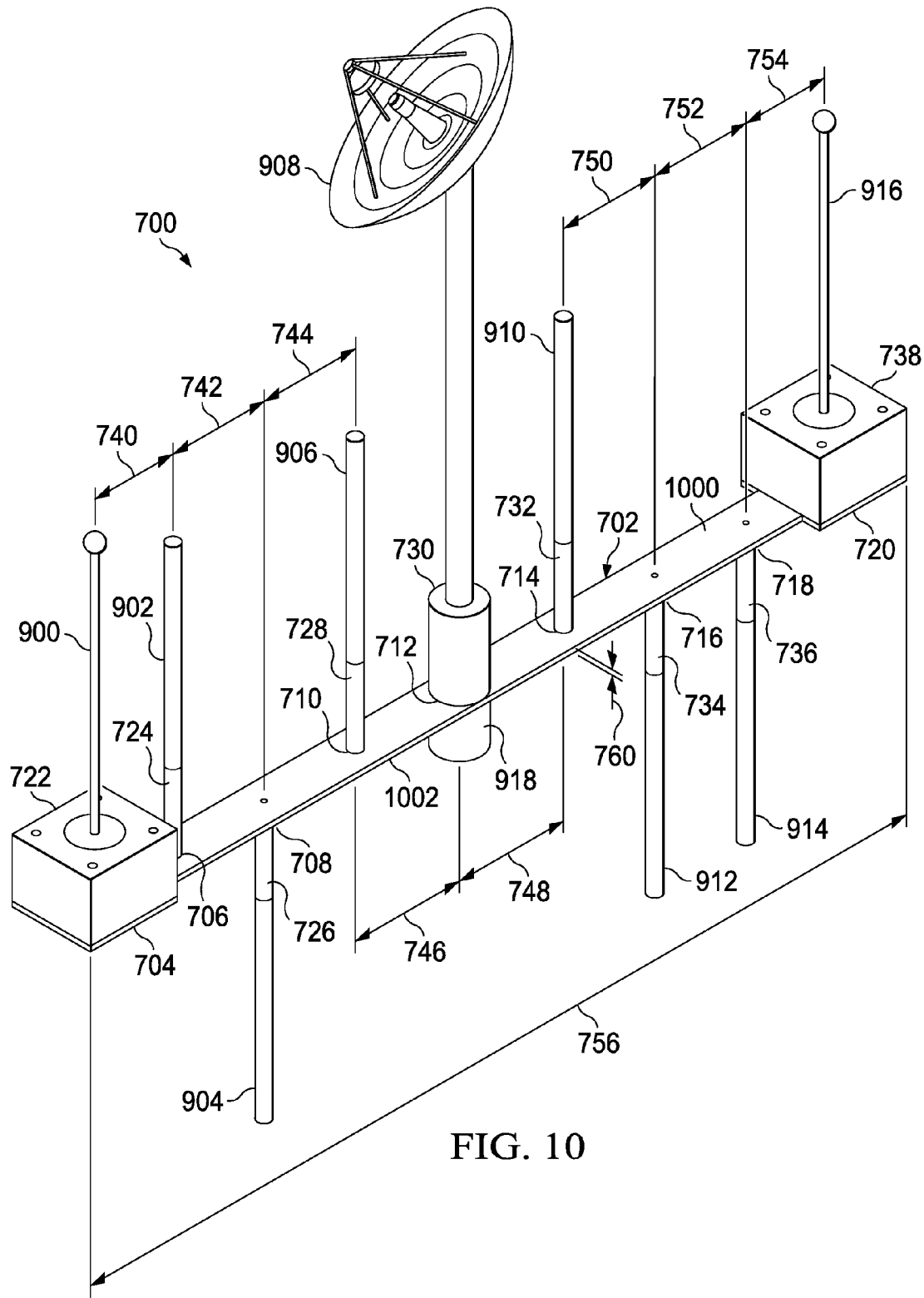
FIG. 10 is an illustration of an antenna platform with a different configuration in accordance with an illustrative embodiment.

Turning to FIG. 10, an illustration of antenna platform 700 with a different configuration is depicted in accordance with an illustrative embodiment. In this illustrative example, mounting unit 726, mounting unit 734, and mounting unit 736, along with antenna element 904, antenna element 912, and antenna element 914 have been moved from side 1000 to side 1002. These components now are on an opposite side from the other mounting units and antenna elements in this configuration.

Changes in the configuration of antenna platform 700 may be made without redesigning and remanufacturing all of the components for antenna platform 700. In this illustrative example, mounting units were moved from one side to another side. In other illustrative examples, fewer mounting units may be attached to mounting structure 702 if fewer antenna elements may be needed. Further, new interfaces may be made in different locations by forming holes in mounting structure 702. With the new interfaces, the locations of mounting units may be changed by reattaching the mounting units to the interfaces. In this manner, reconfiguration of antenna platform 700 may be made more quickly as compared to current antenna platforms.

With reference next to FIG. 11, an illustration of a mounting structure for an antenna platform is depicted in accordance with an illustrative embodiment. Mounting structure 1100 is another example of an implementation for mounting structure 518 in FIG. 5.

As depicted, mounting structure 1100 has interfaces 1102, 1104, 1106, 1108, 1110, 1112, 1114, 1116, and 1118. In this illustrative example, interfaces 1102, 1110, and 1118 are comprised of holes having a circular shape. Interfaces 1104, 1106, 1108, 1112, 1114, and 1116 comprise holes having a slot shape.

With these elongate openings that form the holes in interfaces 1104, 1106, 1108, 1112, 1114, and 1116, a mounting unit may be attached to a slot. The mounting unit may be moved within the slot. This movement of the mounting unit in the slot may vary the location of the mounting unit on mounting structure 1100.

When a desired location for a mounting unit is identified, the mounting unit may then be secured to the location in the slot with a fastener. In this manner, adjustments may be made to the locations of antenna elements more quickly than forming new interfaces or manufacturing a new mounting structure.

With reference now to FIG. 12, an illustration of a mounting unit is depicted in accordance with an illustrative embodiment. Mounting unit 1200 is an example of a physical implementation for mounting unit 600 shown in block form in FIG. 6.

As depicted, mounting unit 1200 comprises structure 1202. In this illustrative example, structure 1202 has the shape of a cylinder. Structure 1202 has first end 1204 and second end 1206. In this illustrative example, first channel 1208 extends from first end 1204 into structure 1202. Second channel 1210 extends from second end 1206 into structure 1202.

Mounting unit 1200 has height 1212 and diameter 1214. In some cases, diameter 1214 may be the same for all of the mounting units for an antenna. Diameter 1214 may be different for some antennas or other mounting units, depending on the particular implementation.

Turning now to FIG. 13, an illustration of an end of a mounting unit is depicted in accordance with an illustrative embodiment. A view of first end 1204 in mounting unit 1200 is depicted in this figure.

First channel 1208 is configured to receive an antenna element. First channel 1208 has diameter 1300 and a circular shape for the cross section. Diameter 1300 may vary, depending on the particular antenna element that is to be placed into first channel 1208.

With reference now to FIG. 14, an illustration of an end of a mounting unit is depicted in accordance with an illustrative embodiment. In this illustrative example, second end 1206 of mounting unit 1200 is depicted.

Second channel 1210, in this illustrative example, is configured to receive a fastener. With the use of the fastener, second end 1206 may be secured to an interface on mounting structure 702 in antenna platform 700 in FIG. 7. Second channel 1210 has diameter 1400. Diameter 1400 may vary, depending on the particular antenna element that is to be placed into second channel 1210.

Figure 15:
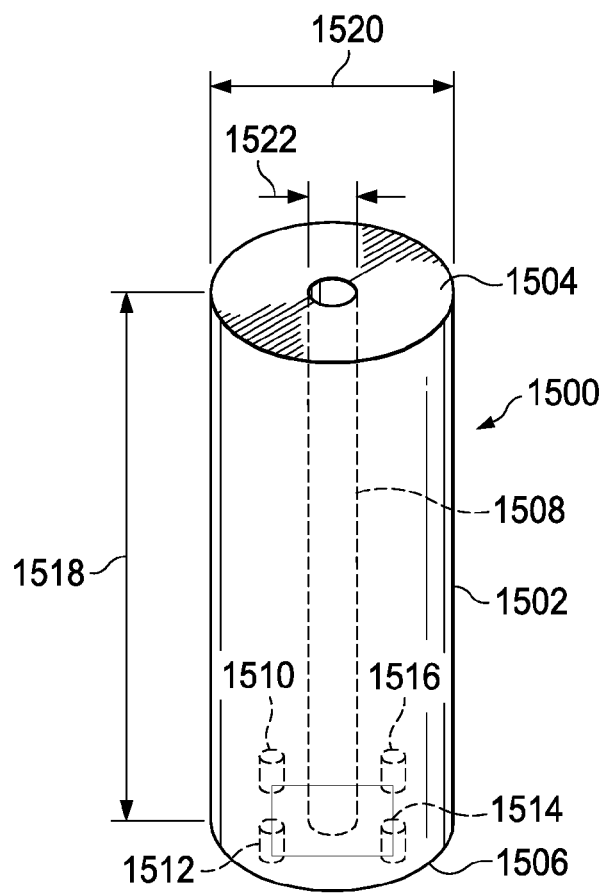
FIG. 15 is another illustration of a mounting unit in accordance with an illustrative embodiment.

With reference now to FIG. 15, another illustration of a mounting unit is depicted in accordance with an illustrative embodiment. In this illustrative example, mounting unit 1500 comprises structure 1502.

Structure 1502 has first end 1504 and second end 1506. Channel 1508 extends all the way through structure 1502 from first end 1504 to second end 1506. Structure 1502 also has channels 1510, 1512, 1514, and 1516. These channels extend from second end 1506 into structure 1502. In this illustrative example, structure 1502 has height 1518 and diameter 1520. Channel 1508 has diameter 1522.

Figure 16:
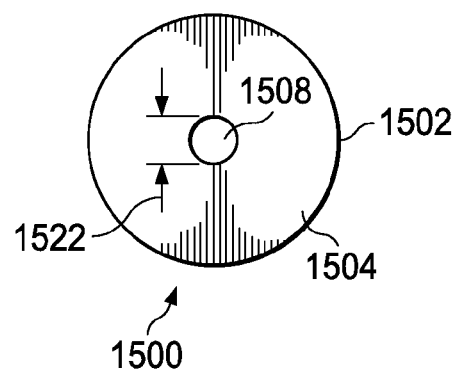
FIG. 16 is an illustration of an end of a mounting unit in accordance with an illustrative embodiment.

Turning now to FIG. 16, an illustration of an end of a mounting unit is depicted in accordance with an illustrative embodiment. In this illustrative example, first end 1504 of structure 1502 for mounting unit 1500 is depicted. Channel 1508 is configured to receive an antenna element in these illustrative examples.

Figure 17:
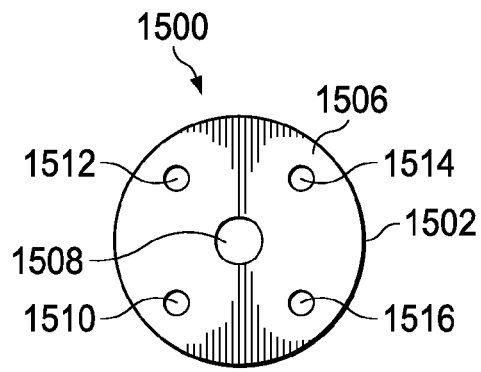
FIG. 17 is an illustration of an end of a mounting unit in accordance with an illustrative embodiment.

In FIG. 17, an illustration of an end of a mounting unit is depicted in accordance with an illustrative embodiment. In this view, second end 1506 of structure 1502 from mounting unit 1500 is illustrated. In this illustrative example, channel 1508 can be seen at second end 1506. Additionally, channels 1510, 1512, 1514, and 1516 are illustrated. These channels are configured to receive fasteners in this illustrative example. With the use of fasteners placed through an interface into channels 1510, 1512, 1514, and 1516; mounting unit 1500 may be secured to an interface on antenna platform 700 in FIG. 7.

The illustration of antenna platform 700 in FIG. 7, mounting unit 1200 in FIGS. 12-14, and mounting unit 1500 in FIGS. 15-17 is not meant to imply physical or architectural limitations to the manner in which an illustrative embodiment may be implemented. For example, other mounting structures may have other interfaces than those illustrated for mounting structure 702.

Further, mounting unit 1200 and mounting unit 1500 may have shapes other than a cylinder. For example, mounting unit 1200 and mounting unit 1500 may be a cube, a rectangular prism, and/or other suitable shapes. As yet another example, although mounting structure 702 is shown as a substantially planar or elongate member, mounting structure 702 may have other shapes. For example, mounting structure 702 may have the shape of a cross, a Y shape, a triangular shape, or some other suitable shape.

Figure 18:
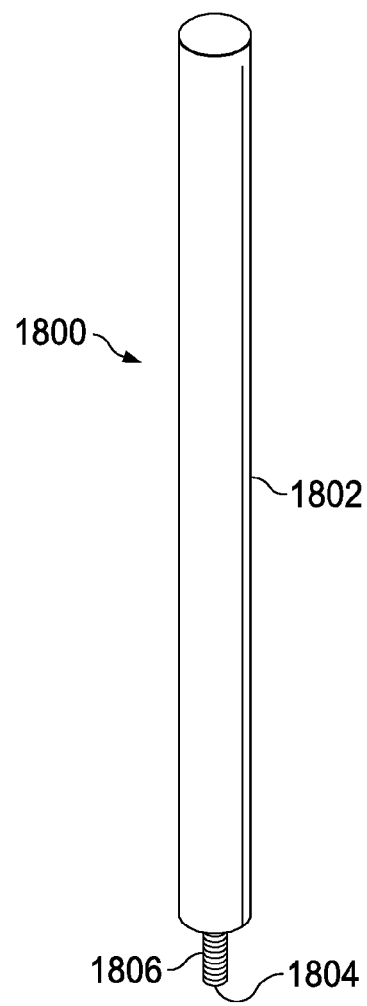
FIG. 18 is an illustration of an antenna element in accordance with an illustrative embodiment.

With reference now to FIG. 18, an illustration of an antenna element is depicted in accordance with an illustrative embodiment. As depicted, antenna element 1800 is an example of an antenna element that may be connected to mounting unit 1200 in FIG. 12 or mounting unit 1500 in FIG. 15. Antenna element 1800 has cylinder 1802 and post 1804. Post 1804 is configured to be placed into first channel 1208 in mounting unit 1200 or channel 1508 in mounting unit 1500.

Post 1804 may include features, such as threads 1806 or other suitable features that may engage first channel 1208 or channel 1508 in these illustrative examples. In other illustrative examples, adhesive or some other material may be used to secure post 1804 within first channel 1208 or channel 1508.

The different components illustrated in FIGS. 7-18 may be combined with components in FIG. 5 and FIG. 6, used with components in FIG. 5 and FIG. 6, or a combination of the two. Additionally, some of the components in FIGS. 7-18 are illustrative examples of how components shown in block form in FIG. 5 and FIG. 6 may be implemented as physical structures.

Figure 19:
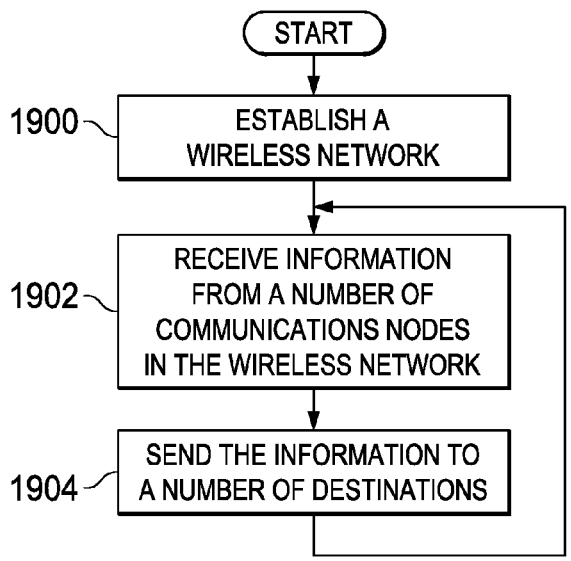
FIG. 19 is an illustration of a flowchart of a process for operating a portable wireless communications node in accordance with an illustrative embodiment.

Turning now to FIG. 19, an illustration of a flowchart of a process for operating a portable wireless communications node is depicted in accordance with an illustrative embodiment. The process illustrated in FIG. 19 may be implemented using portable wireless communications node 200 in FIG. 2. In particular, this process may be implemented for use in communications environment 100 in FIG. 1.

The process begins by establishing a wireless network (operation 1900). In these illustrative examples, the portable wireless communications node sets up a network for use by other communications nodes. For example, the portable wireless communications node may receive requests from communications nodes to access the network. The portable wireless communications node may determine whether access is allowed by a requesting communications node. Further, the portable wireless communications node may provide domain name system services.

Next, the portable wireless communications node receives information from a number of communications nodes in the wireless network (operation 1902). The portable wireless communications node then sends the information to a number of destinations (operation 1904), with the process returning to operation 1902. These destinations may be other wireless communications nodes in the network or a remote node in another network. These operations may continue as long as the portable wireless communications node is functioning.

Figure 20:
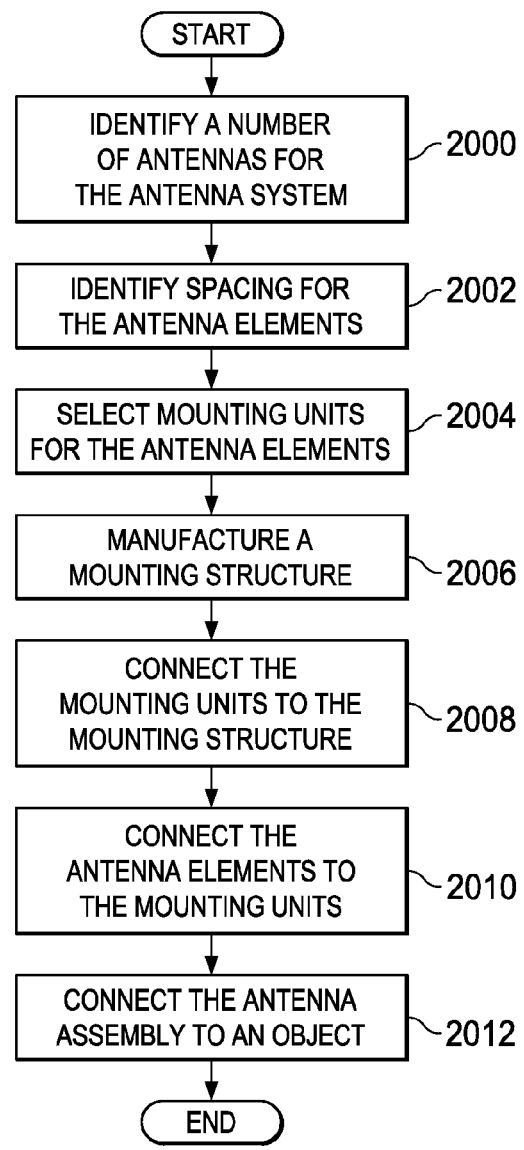
FIG. 20 is an illustration of a flowchart of a process for assembling an antenna system in accordance with an illustrative embodiment.

With reference now to FIG. 20, an illustration of a flowchart of a process for assembling an antenna system is depicted in accordance with an illustrative embodiment. The process illustrated in FIG. 20 may be implemented using antenna system 508 with antenna platform 516 in FIG. 5.

The process identifies a number of antennas for the antenna system (operation 2000). The process then identifies spacing for the antenna elements (operation 2002). Mounting units are selected for the antenna elements (operation 2004). The spacing in operation 2004 is selected to reduce interference between antenna elements, antennas, and a combination of the two.

A mounting structure is manufactured (operation 2006). The manufacture of the mounting structure may be performed by forming interfaces in a mounting structure. In other illustrative examples, if a mounting structure is not already present with the desired dimensions; the mounting structure may be manufactured. The mounting units are then connected to the mounting structure (operation 2008).

The process then connects the antenna elements to the mounting units (operation 2010). The antenna assembly is then connected to an object (operation 2012), with the process terminating thereafter.

Figure 21:
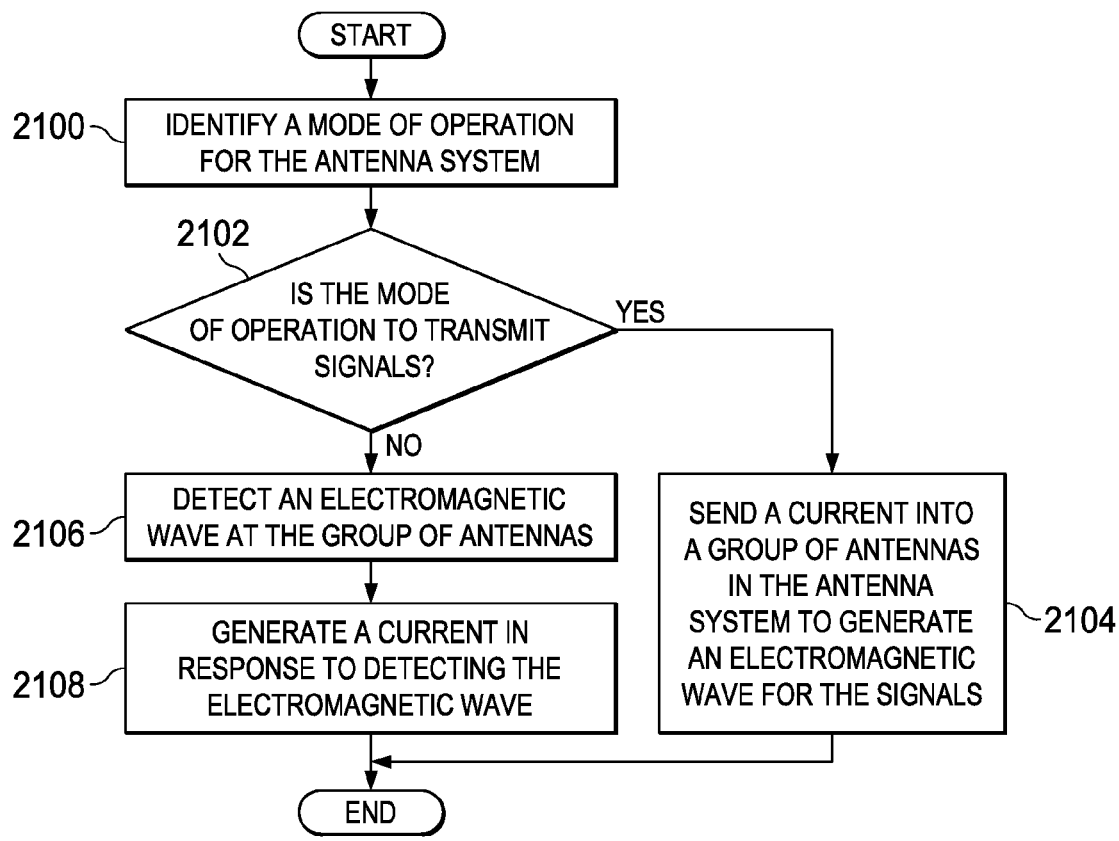
FIG. 21 is an illustration of a flowchart of a process for operating an antenna assembly in accordance with an illustrative embodiment.

With reference now to FIG. 21, an illustration of a flowchart of a process for operating an antenna assembly is depicted in accordance with an illustrative embodiment. The process illustrated in FIG. 21 may be implemented using antenna system 508 with antenna platform 516 in FIG. 5.

The process begins by identifying a mode of operation for the antenna system (operation 2100). A determination is made as to whether the mode of operation is to transmit signals (operation 2102). If the mode of operation is to transmit signals, a current is sent into a group of antennas in the antenna system to generate an electromagnetic wave for the signals (operation 2104), with the process terminating thereafter. In this illustrative example, the electromagnetic wave may be generated by one or more of the antennas in the group of antennas. The group of antennas is connected to an antenna platform, such as antenna platform 516 in FIG. 5.

With reference again to operation 2102, if the mode of operation is not to transmit signals, the process detects an electromagnetic wave at the group of antennas (operation 2106). A current is then generated in response to detecting the electromagnetic wave (operation 2108), with the process terminating thereafter. This process may be repeated each time signals are to be transmitted or signals are to be received. In either mode of operation, electromagnetic energy for the electromagnetic wave is coupled to the current through the group of antennas. In one instance, the coupling results in the electromagnetic wave being generated in response to the current. In another instance, the coupling of the electromagnetic wave causes the current to be generated.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step.

In some alternative implementations of an illustrative embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the different illustrative embodiments provide a method and apparatus for an antenna system. In one illustrative embodiment, a mounting structure has interfaces. Mounting units are configured to be connected to the mounting structure at the mounting interfaces and connected to antenna elements for an antenna. A mounting unit in the mounting units is configured to receive an antenna element in the antenna elements.

In these illustrative examples, the use of a mounting structure and mounting units provide for more flexibility in assembling antenna systems. The different illustrative embodiments also allow for easier reconfiguration of an existing antenna system in which a new antenna platform may not be needed. For example, if some of the antenna elements change in size, new mounting units may be used to attach those antenna elements to the same mounting structure.

Further, when designing an antenna system, interfaces may be formed in the mounting structure, and mounting units may be selected for the different antenna elements. As a result, having to manufacture an entire antenna platform each time a new antenna system is designed or when an existing antenna system is reconfigured may be avoided.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A portable wireless communications node comprising:
a portable platform;
a battery system connected to the portable platform;
an energy harvester connected to the portable platform and configured to charge the battery system;
a group of antennas;
an antenna platform comprising:
a mounting structure;
a mounting post connecting the mounting structure to the portable platform;
a number of interfaces in the mounting structure; and
a number of mounting units connected to the mounting structure at the number of interfaces and connected to a number of antenna elements for the group of antennas, wherein a mounting unit in the number of mounting units is configured to receive an antenna element in the number of antenna elements;
a transceiver connected to the portable platform and the group of antennas, wherein the transceiver receives power from the battery system and is configured to send and receive radio frequency signals through the group of antennas; and
a wireless communications system that comprises the transceiver and is configured to provide three or more of WiFi access, cellular communications, tactical radio frequency communications, and satellite communications via the group of antennas.

2. The portable wireless communications node of claim 1 further comprising:
a surveillance package connected to the portable platform;
wherein the surveillance package includes a sensor system;
wherein the surveillance package generates information about targets of interest in an environment around the portable wireless communications node; and
wherein the targets of interest include one or more of people and vehicles.

3. The portable wireless communications node of claim 2,
wherein the sensor system comprises at least one of a video sensor system and an audio sensor system;
wherein the sensor system comprises a thermometer and a vibration detector;
wherein the sensor system controls a weapon connected to the portable wireless communications node; and
wherein the weapon is one of an explosive, a projectile, and a gas.

4. The portable wireless communications node of claim 1 further comprising:
a network device configured to:
route information in the radio frequency signals received by the transceiver over the group of antennas,
establish a network for use by a plurality of communications nodes other than the portable wireless communications node,
function as one of a router and a gateway for handling communications with the communications nodes,
receive information from a first communications node over a first communications link through the wireless communications system and route that information to a second communications node on a second communications link, and
provide voice communications between different communications nodes.

5. The portable wireless communications node of claim 1, wherein the energy harvester is selected from at least one of a solar cell, a thermoelectric generator, a wind turbine, and a tree metabolic energy harvester.

6. The portable wireless communications node of claim 1, wherein the mounting structure is substantially planar; the number of interfaces are holes; and locations of the holes are configured to reduce interference between a first antenna and a second antenna in the group of antennas.

7. The portable wireless communications node of claim 1,
wherein each mounting unit of the number of mounting units has an opening configured to receive the antenna element in the number of antenna elements; and
wherein the group of antennas comprises a plurality of antennas, and locations for the number of interfaces in the mounting structure reduce interference between the number of antenna elements in the plurality of antennas.

8. The portable wireless communications node of claim 1, wherein the number of antenna elements comprises:
a plurality of whip antennas,
commercial off-the-shelf antenna elements used for cellular communications, and
a parabolic antenna used for directional communications.

9. The portable wireless communications node of claim 1, wherein the portable platform comprises:
a pole configured to be connected to a ground; and
a spike at an end of the pole to be placed into the ground to hold the pole in an upright position.

10. The portable wireless communications node of claim 1,
wherein the materials for components in the portable wireless communications node are selected to provide a thermal signature, a radar signature, and a physical profile to make the portable wireless communications node difficult to detect visually by human operators and other devices;
wherein the portable wireless communications node is camouflaged visually to resemble one of a rock and a tree; and
wherein the wireless communications is configured to provide each of WiFi access, cellular communications, tactical radio frequency communications, and satellite communications via the group of antennas.

11. A method for routing information, the method comprising:
- establishing a wireless network using a portable wireless communications node comprising:
  - a portable platform,
  - an energy harvesting system connected to the portable platform, and
  - a wireless communications system connected to the portable platform, wherein the wireless communications system is configured to transfer the information using radio frequency signals and to provide three or more of WiFi access, cellular communications, tactical radio frequency communications, and satellite communications via a group of antennas;
- receiving the information from a number of communications nodes in the wireless network; and
- sending the information received to a number of destinations.

12. The method of claim 11,
wherein the wireless communications system comprises:
- the group of antennas;
- an antenna platform comprising:
  - a mounting structure,
  - a mounting post connecting the mounting structure to the portable platform,
  - a number of interfaces in the mounting structure, and
  - a number of mounting units connected to the mounting structure at the number of interfaces and connected to a number of antenna elements for the group of antennas, wherein a mounting unit in the number of mounting units is configured to receive an antenna element in the number of antenna elements; and
- a transceiver connected to the portable platform and the group of antennas, wherein the transceiver receives power from the battery system and is configured to send and receive radio frequency signals through the group of antennas.

13. A portable wireless communications node comprising:
a portable platform;
a battery system connected to the portable platform;
an energy harvester connected to the portable platform and configured to charge the battery system;
a group of antennas;
an antenna platform comprising:
- a mounting structure;
- a mounting post connecting the mounting structure to the portable platform;
- a number of interfaces in the mounting structure; and
- a number of mounting units connected to the mounting structure at the number of interfaces and connected to a number of antenna elements for the group of antennas, wherein a mounting unit in the number of mounting units is configured to receive an antenna element in the number of antenna elements;

a transceiver connected to the portable platform and the group of antennas, wherein the transceiver receives power from the battery system and is configured to send and receive radio frequency signals through the group of antennas; and
a wireless communications system that comprises the transceiver and is configured to provide three or more of WiFi access, cellular communications, tactical radio frequency communications, and satellite communications via the group of antennas;
a surveillance package connected to the portable platform;
a network device configured to:
- route information in the radio frequency signals received by the transceiver over the group of antennas,
- establish a network for use by a plurality of communications nodes other than the portable wireless communications node,
- function as one of a router and a gateway for handling communications with the communications nodes,
- receive information from a first communications node over a first communications link through the wireless communications system and route that information to a second communications node on a second communications link, and
- provide voice communications between different communications nodes;

wherein the surveillance package includes a sensor system;
wherein the surveillance package generates information about targets of interest in an environment around the portable wireless communications node;
wherein the targets of interest include one or more of people and vehicles;
wherein the sensor system comprises at least one of a video sensor system and an audio sensor system;
wherein the sensor system comprises a thermometer and a vibration detector;
wherein the sensor system controls a weapon connected to the portable wireless communications node;
wherein the weapon is one of an explosive, a projectile, and a gas;
wherein the energy harvester is selected from at least one of a solar cell, a thermoelectric generator, a wind turbine, and a tree metabolic energy harvester;
wherein the mounting structure is substantially planar; the number of interfaces are holes;
and locations of the holes are configured to reduce interference between a first antenna and a second antenna in the group of antennas;
wherein each mounting unit of the number of mounting units has an opening configured to receive the antenna element in the number of antenna elements;
wherein the group of antennas comprises a plurality of antennas, and locations for the number of interfaces in the mounting structure reduce interference between the number of antenna elements in the plurality of antennas;
wherein the number of antenna elements comprises:
- a plurality of whip antennas,
- commercial off-the-shelf antenna elements used for cellular communications, and
- a parabolic antenna used for directional communications;

wherein the portable platform comprises:
- a pole configured to be connected to a ground; and
- a spike at an end of the pole to be placed into the ground to hold the pole in an upright position;

wherein the materials for components in the portable wireless communications node are selected to provide a thermal signature, a radar signature, and a physical profile to make the portable wireless communications node difficult to detect visually by human operators and other devices;
wherein the portable wireless communications node is camouflaged visually to resemble one of a rock and a tree; and
wherein the wireless communications is configured to provide each of WiFi access, cellular communications, tactical radio frequency communications, and satellite communications via the group of antennas.

* * * * *